US012739714B2

(12) United States Patent
Zhang et al.

(10) Patent No.: US 12,739,714 B2
(45) Date of Patent: Sep. 15, 2026

(54) INTER-CELL MOBILITY AND CONNECTIVITY OPERATION

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Fangli Xu, Beijing (CN); Haitong Sun, Cupertino, CA (US); Oghenekome Oteri, Cupertino, CA (US); Qiming Li, Beijing (CN); Wei Zeng, Saratoga, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 1042 days.

(21) Appl. No.: 17/442,583

(22) PCT Filed: Mar. 31, 2021

(86) PCT No.: PCT/CN2021/084513

§ 371 (c)(1),
(2) Date: Sep. 23, 2021

(87) PCT Pub. No.: WO2022/205118

PCT Pub. Date: Oct. 6, 2022

(65) Prior Publication Data

US 2023/0337075 A1 Oct. 19, 2023

(51) Int. Cl.
*H04W 36/00* (2009.01)
*H04W 36/08* (2009.01)
(Continued)

(52) U.S. Cl.
CPC ....... *H04W 36/0077* (2013.01); *H04W 36/08* (2013.01); *H04W 72/0457* (2023.01); *H04W 72/232* (2023.01)

(58) Field of Classification Search
CPC ............ H04W 36/0077; H04W 36/08; H04W 72/0457; H04W 72/232
See application file for complete search history.

(56) References Cited

U.S. PATENT DOCUMENTS

2019/0357092 A1 11/2019 Jung et al.
2020/0112886 A1 4/2020 John Wilson et al.
(Continued)

FOREIGN PATENT DOCUMENTS

CN 102843742 A 12/2012
CN 112369116 2/2021
(Continued)

OTHER PUBLICATIONS

3rd Generation Partnership Project: Technical Specification Group Radio Access Network; NR Medium Access Control (MAC) Protocol Specification (Release 16); 3GPP TS 38.321 V16.4.0 Mar. 2021 (Year: 2021).*
(Continued)

*Primary Examiner* — Sujoy K Kundu
*Assistant Examiner* — Samuel Dilan Rutnam
(74) *Attorney, Agent, or Firm* — Kilpatrick Townsend & Stockton LLP

(57) ABSTRACT

The present application relates to devices and components including apparatus, systems, and methods for cross-cell indication of radio network temporary identifiers or mobility based on bandwidth part switching.

16 Claims, 17 Drawing Sheets

(51) Int. Cl.
*H04W 72/0457* (2023.01)
*H04W 72/232* (2023.01)

(56) References Cited

U.S. PATENT DOCUMENTS

2020/0296635 A1 9/2020 Rastegardoost et al.
2020/0351729 A1 11/2020 Rastegardoost et al.
2022/0271821 A1* 8/2022 Farag .................... H04L 5/0035
2023/0096338 A1* 3/2023 Koskela ................ H04L 5/0091 370/331

FOREIGN PATENT DOCUMENTS

EP 3735032 A1 * 11/2020 ........ H04W 36/0072
EP 4290911 A1 * 12/2023 ............ H04W 16/28
WO WO-2022168876 A1 * 8/2022 ............ H04W 16/28

OTHER PUBLICATIONS

International Patent Application No. PCT/CN2021/084513, International Preliminary Report on Patentability, Oct. 12, 2023, 8 pages.
3GPP TS 38.300 V16.3.0, NR and NG-RAN Overall Description Stage 2 (Release 16), 3GPP Technical Specification Group Radio Access Network, Nov. 2020, 13 pages.
International Patent Application No. PCT/CN2021/084513, International Search Report and Written Opinion, Mailed on Dec. 30, 2021, 12 pages.
3rd Generation Partnership Project; Technical Specification Group Radio Access Network; NR; Multiplexing and channel coding (Release 16), 3GPP TS 38.212 V16.5.0, Mar. 2021, 152 pages.
3rd Generation Partnership Project; Technical Specification Group Radio Access Network; NR; Physical layer procedures for data (Release 16), 3GPP TS 38.214 V16.5.0, Mar. 2021, 171 pages.
3rd Generation Partnership Project; Technical Specification Group Radio Access Network; NR; Medium Access Control (MAC) protocol specification (Release 16), 3GPP TS 38.321 V16.4.0, Mar. 2021, 157 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
"Lower-layer Mobility Enhancements", 3rd Generation Partnership Project, Technical Specification Group, Radio Access Network, Working Group1 Meeting #99, R1-1912060, Nov. 18-22, 2019, 9 pages.
"LS on TCI State Update for L1/L2-centric Inter-Cell Mobility", 3rd Generation Partnership Project, Technical Specification Group, Radio Access Network, Working Group1 Meeting #104-e, R1-2102248, Jan. 25-Feb. 5, 2021, 3 pages.
Chinese Patent Application No. 202180095776.4, "Office Action", May 23, 2026, 14 pages.

* cited by examiner

300

500

PRACH
sociated with PC1 (C-RNTI1)

Msg 2

Msg 3
(Report C-RNTI1)

Msg 4

Time

Beam 1

Beam 2

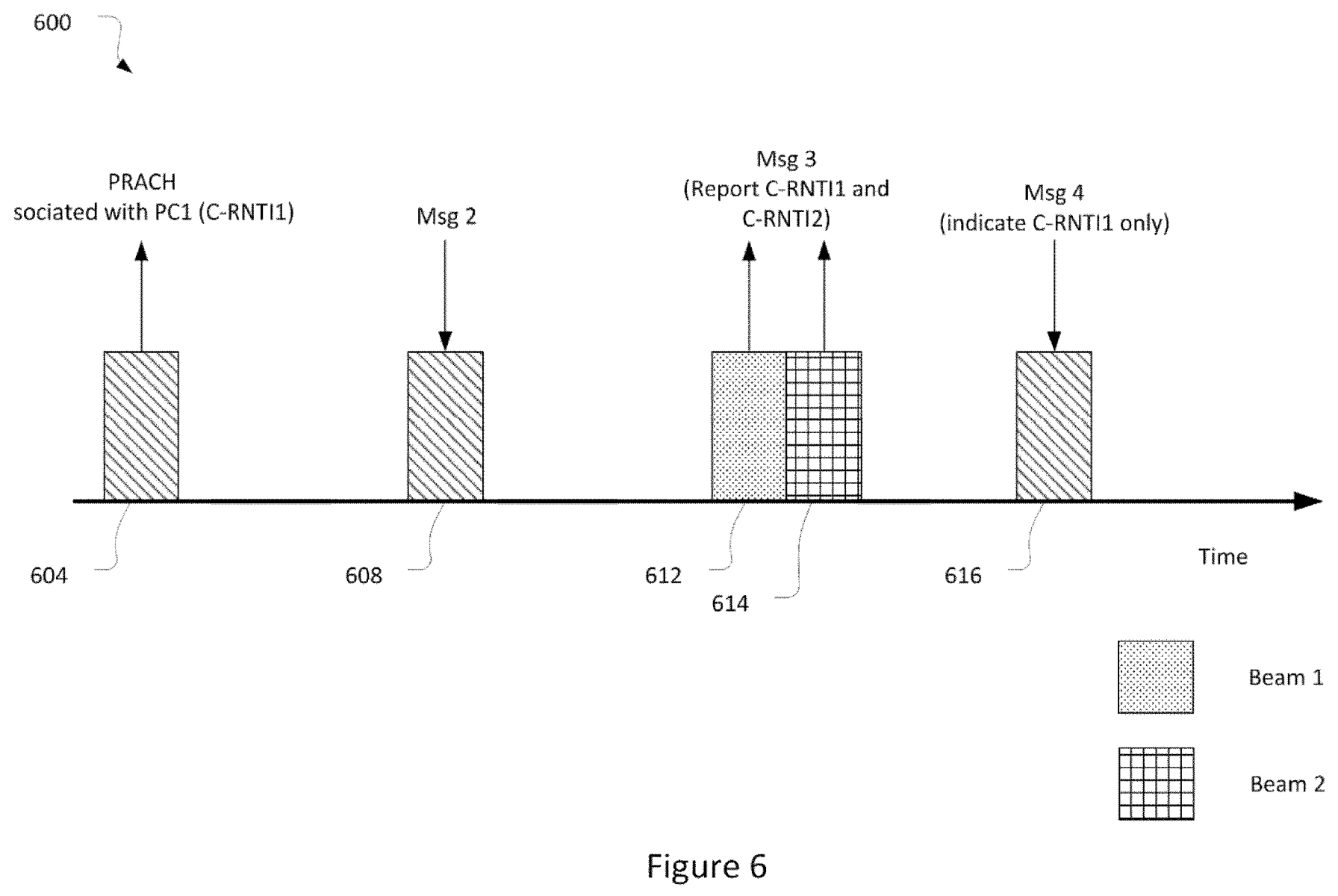

PRACH
sociated with PC1 (C-RNTI1)

604

Msg 2

608

Msg 3
(Report C-RNTI1 and
C-RNTI2)

612

614

Msg 4
(indicate C-RNTI1 only)

616

Time

Beam 1

Beam 2

Figure 6

Candidate cell

Serving cell

Cell 3
Initial BWP 3

104

Cell 2
Initial BWP 2

Cell 1
Initial BWP 1

INTER-CELL MOBILITY AND CONNECTIVITY OPERATION

CROSS-REFERENCE TO RELATED APPLICATIONS

This application is a U.S. National Phase of PCT/CN2021/084513, filed Mar. 31, 2021, the disclosure of which is herein incorporated by reference in its entirety for all purposes.

BACKGROUND

Third Generation Partnership Project (3GPP) provides a flexible deployment for adaptive connectivity scenarios that allow a user equipment to communicatively couple with a plurality of base stations. A UE connection to a radio access network may be handed over from one cell to another cell using an inter-cell mobility operation. A UE may also have a plurality of simultaneous connections with more than one transmit-receive points (TRPs).

BRIEF DESCRIPTION OF THE DRAWINGS

FIG. 5 includes another signaling diagram in accordance with some embodiments.

FIG. 6 includes another signaling diagram in accordance with some embodiments.

FIG. 11 illustrates another network environment in accordance with some embodiments.

DETAILED DESCRIPTION

Figure 1:
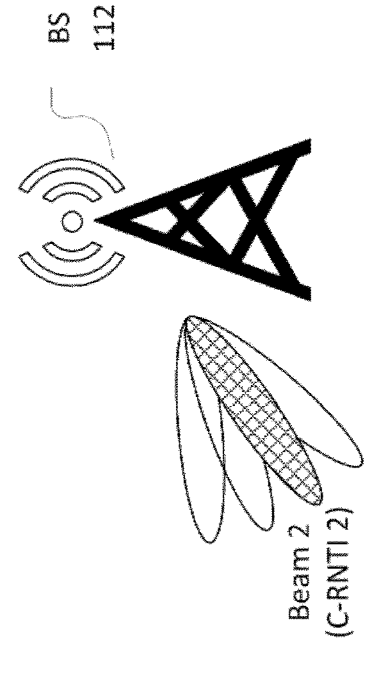
FIG. 1 illustrates a network environment in accordance with some embodiments.
Figure 1:
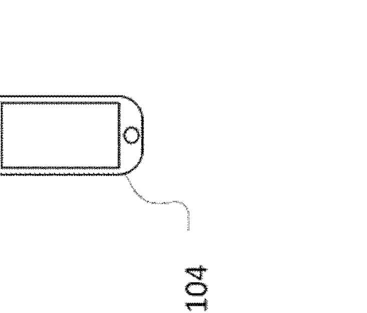
Figure 1:
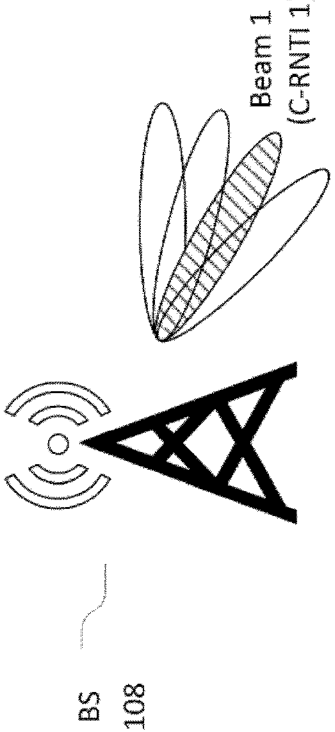

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc, in order to provide a thorough understanding of the various aspects of various embodiments. However, it will be apparent to those skilled in the an having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel." "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104, base station 108, and base station 112. The base stations 108/112 may provide one or more wireless serving cells, for example, 3GPP New Radio (NR) cells, through which the UE 104 may communicate with the base stations 108/112/112.

The UE 104 and the base stations 108/112 may communicate over an air interface compatible with 3GPP technical specifications such as those that define Fifth Generation (5G) NR system standards. The base stations 108/112 may include a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

In some embodiments, the base stations 108/112 may use distributed TRPs, which may also be referred to as antenna panels, to geographically separate points at which a signal may be transmitted to, or received from, the UE 104. This may increase flexibility of using multiple-input, multiple-output and beamforming enhancements for communicating with the UE 104. The TRPs may be used to transmit downlink transmissions to the UE 104 and receive uplink transmissions from the UE 104. In some embodiments, the distributed transmit/receive capabilities provided by the TRPs may be used for coordinated multipoint or carrier aggregation systems from one or more base stations.

The base stations 108/112 and the UE 104 may include arrays of antenna elements that allow receive or transmit beamforming. Beamforming may improve the uplink and downlink budgets by determining and using uplink and downlink beams that increase antenna gain and overall system performance. The UE 104 and the base stations 108/112 may determine desired uplink-downlink beam pairs using beam management operations based on reference signal measurements and channel reciprocity assumptions.

In the downlink direction, the base station 108 may send synchronization signal blocks (SSBs) and channel state information-reference signals (CSI-RSs) that are measured by the UE 104 to determine the desired downlink beam pair for transmitting/receiving physical downlink control channel (PDCCH) and physical downlink shared channel (PDSCH) transmissions. In some embodiments, the network elements may assume uplink/downlink beam correspondence and use the desired downlink beam pair as the desired uplink beam pair for physical uplink shared channel (PUSCH) and physical uplink control channel (PUCCH) transmissions. In some embodiments, beam pairs may be independently determined for the uplink direction based on sounding reference signals (SRSs) transmitted by the UE 104. In various embodiments, beam management may include different stages such as initial acquisition of the uplink and downlink beams, and later refinement of the uplink and downlink beams.

Advancements in 3GPP networks provide for inter-cell mobility and inter-cell multi-TRP operation to be performed by control signaling in lower layers of a protocol stack, without the involvement of upper layers of the protocol stack. For example, the network environment 100 may support both layer 1 (L1)/layer 2 (L2)-centric inter-cell mobility and inter-cell multi-TRP operation. For L1/L2-centric inter-cell mobility, a serving cell may indicate a beam based on a non-serving cell reference signal (RS), for example a synchronization signal and physical broadcast channel block (SSB) or channel state information (CSI)-RS. Consider, for example, that the UE 104 is initially coupled with a serving cell provided by the base station 108. The base station 108 may provide an indication of a beam that is based on a reference signal transmitted in a non-serving, neighbor cell provided by base station 112. The UE 104 may start to communicate with the new serving cell (for example, the neighbor cell provided by base station 112) based on the indicated beam after receiving the beam indication from the base station 108.

For inter-cell multi-TRP operation, the UE 104 may communicate with two cells. For example, the UE 104 may communicate with a serving cell provided by the base station 108 and a serving cell provided by the base station 112. The signals for each cell may be multiplexed in a time division multiplexing (TDM), a frequency division multiplexing (FDM), or spatial division multiplexing (SDM) manner.

The UE 104 may be assigned with a dedicated cell radio network temporary identifier (C-RNTI) for communicating in a given cell. For example, a first C-RNTI (C-RNTI 1) may be assigned to the UE 104 for communicating, via beam 1, in a cell provided by the base station 108 and a second C-RNTI (C-RNTI 2) may be assigned to the UE 104 for communicating, via beam 2, in a cell provided by the base station 112. Thereafter, signals corresponding to a particular cell may be generated based on the C-RNTI of the cell. The C-RNTI may be used to scramble cyclic redundancy check (CRC) bits that are added to a payload of downlink control information (DCI) in order to address the UE 104 when making resource allocations in a given cell. The C-RNTIs may be configured by radio resource control (RRC) signaling.

Embodiments of the present disclosure describe aspects related to cross-cell RNTI indication for both the inter-cell multi-TRP and L1/L2 centric inter-cell mobility. These aspects include cross-cell C-RNTI configuration, lower layer control signaling for C-RNTI indication, and uplink/downlink signal and C-RNTI association. While various embodiments are described with respect to C-RNTI, these teachings may also be applicable to other subsets or even all RNTIs associated with dedicated signals including, for example, modulation and coding scheme (MCS)-C-RNTI, configured scheduling (CS)-RNTI, and semi-persistent (SP)-CSI-RNTI.

In some embodiments, one serving cell may provide C-RNTI configurations for one or more cells. The C-RNTI configuration may include C-RNTI information according to one or more of the following options.

In a first option, a serving cell can configure the UE 104 with an absolute C-RNTI (for example, a value from 1-65,522) for a physical cell identity (PCI) corresponding to another cell. For example, the base station 108 may provide the UE 104 with an absolute value of the C-RNTI 2 and an indication that C-RNTI 2 is associated with a PCI of the neighbor cell provided by base station 112 (for example, PCI 2).

In a second option, the serving cell can configure a differential C-RNTI for a PCI corresponding to another cell. The differential C-RNTI may be calculated with reference to the C-RNTI for the serving cell. For example, the base station 108 may provide the UE 104 with a differential value that is associated with the PCI of the neighbor cell provided by the base station 112. The UE 104 may determine C-RNTI 2 based on C-RNTI 1 and the differential value.

In a third option, the serving cell can configure a C-RNTI offset for a PCI corresponding to another cell. The C-RNTI offset can be determined by the C-RNTI for the serving cell and non-serving cell as well as a UE identity (ID), for example, a temporary mobile subscriber identity (TMSI) or a higher-layer configured ID. The UE 104 may calculate the C-RNTI for the non-serving cell based on the C-RNTI offset, the C-RNTI for the serving cell, the PCI of the non-serving cell, and a UE ID or higher-layer configured ID. For example, the base station 108 may provide the UE 104 with a C-RNTI offset that is associated with the PCI of the neighbor cell provided by the base station 112. The UE 104 may then determine C-RNTI 2 based on C-RNTI 1, the C-RNTI offset, and a UE ID or higher-layer configured ID. For example, CRNTI 2 may be determined based on: C-RNTI2=(C-RNTI1+UE_ID) mod (2^16)+C-RNTI_offset. For another example, CRNTI 2 may be determined based on: C-RNTI2=C-RNTI1 XOR (lower 16 bit of UE_ID)+C-RNTI_offset, where XOR is an exclusive or.

In a fourth option, the serving cell may use RRC signaling to configure the UE 104 with possible PCI to C-RNTI associations and a dynamic indication may be used to indicate which of the possible associations are to be used. For example, the RRC signaling may include a list of PCIs, with individual PCIs being associated with a pool of C-RNTIs. Subsequently, DCL may be used to indicate which C-RNTI of the pool of C-RNTIs is to be used for a corresponding PCI. The DCI indication may be included in a bitmap. For example, the base station 108 may use RRC signaling to configure the UE 104 with information to associate a PCI of the base station 112 with a plurality of C-RNTIs. Subsequently, DCI (transmitted by the base station 108 or the base station 112) may be used to select one of the plurality of C-RNTIs (for example, C-RNTI 2) to be associated with the PCI of the base station 112.

The fourth option may be combined with one or more of the other options and used for a mixed-control signaling scheme. For example, RRC signaling may be used in conjunction with DCI or media access control (MAC) control element (CE) to provide the relevant C-RNTI information for neighbor cells.

If the serving cell provides C-RNTI information for another cell by RRC signaling, the first option may be used. If the serving cell provide C-RNTI information for another cell by lower layer signaling (for example, MAC CE or DCI), the second or third options may be used since there may be little to no encryption for lower layer signaling and the second and third options could be done with lower overhead.

The following five options describe control signaling that may be used to provide the indication of the C-RNTI information introduced above.

In a first option, a serving cell may provide the C-RNTI information for a non-serving cell using RRC signaling. The RRC signaling may be used to provide various C-RNTI configurations.

Figure 2:
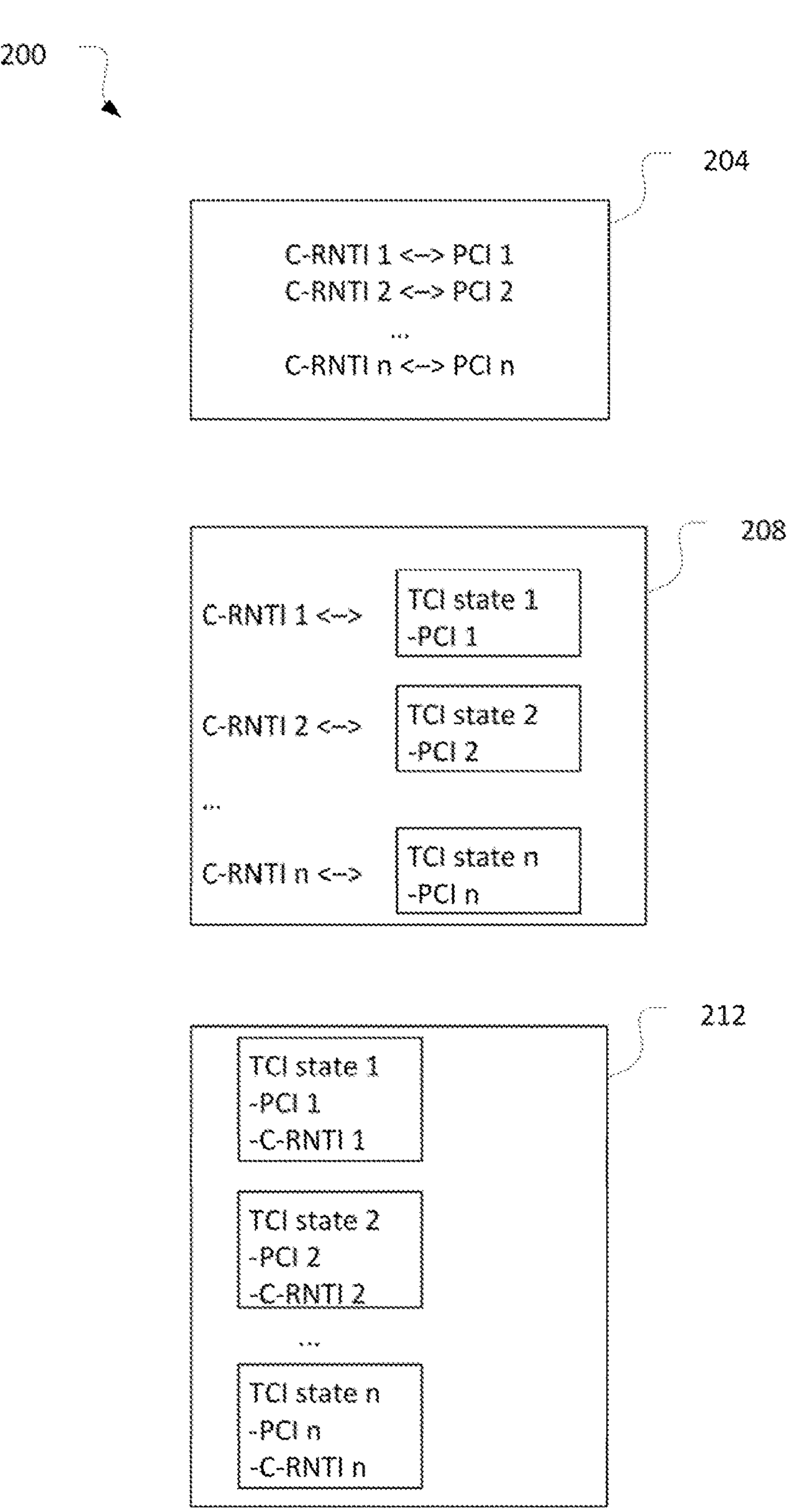
FIG. 2 illustrates a cell-radio network temporary identifier configurations in accordance with some embodiments.

FIG. 2 illustrates C-RNTI configurations 200 that may be provided by RRC signaling in accordance with some embodiments. The configuration information to provide the C-RNTI configurations 200 may be transmitted through a serving cell of the base station 108 and may include C-RNTI information with respect to neighbor cells, such as a neighbor cell provided by base station 112.

In C-RNTI configuration 204, the RRC signaling may associate C-RNTI information with PCIs. For example, as shown, the C-RNTI configuration 204 associates: C-RNTI 1 with PCI 1 (which may correspond to serving cell provided by base station 108); C-RNTI 2 with PCI 2 (which may correspond to the neighbor cell provided by base station 112); and C-RNTI n with PCI n. When the UE 104 proceeds with an L1/L2 handover and detects a PCI of the neighbor cell, the UE 104 may be able to determine the C-RNTI of the neighbor cell based on the previously configured C-RNTI information.

In some embodiments, the UE 104, performing an L1/L2 handover, may detect a PCI of a neighbor cell based on an indicated transmission configuration indicator (TCI) state.

The base station 108 may configure the UE 104 with TC state information to indicate quasi-co-location (QCL) relationships between antenna ports used for reference signals (for example, SSB or CSI-RS) and downlink data or control signaling, for example, PDSCH or PDCCH. Initially, the base station 108 may configure the UE 104 with a plurality of TC states through RRC signaling. In some embodiments, up to 128 TC states may be configured for PDSCH through, for example, a PUSCH-config information element (IE), and up to 64 TC states may be configured for PDCCH through, for example, a PDCCH-config IE. Each TCI state may include a PCI, a bandwidth part ID, an indication of the relevant SSB or CSI-RS, and an indication of the QCL type. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The TCI states may be set as inactive after initial configuration. The base station 108 may then transmit an activation command through, for example, a MAC control element. The activation command may activate up to eight combinations of one or two TC states that correspond to eight codepoints of a TCI field in DCI. One or more specific TCI states may then be dynamically selected and signaled using the TCI field in DCI to indicate which of the active TCI states are to be used for subsequent transmissions.

For L1/L2 handovers, the base station 108 may provide an indication of a TCI state that is configured or otherwise associated with a neighbor cell's PCI. Thus, when the UE 104 receives the TCI state indication and detects a neighbor cell PCI, it may also know the C-RNTI of the neighbor cell based on the C-RNTI configuration 204.

In C-RNTI configuration 208, the RRC signaling may associate C-RNTI information with a TCI state. Given that each TCI state is configured for a particular PCI, the C-RNTI configuration 208 may provide the C-RNTI-to-PCI association by associating a C-RNTI with a TCI state configured for the relevant PCI. For example, the C-RNTI configuration 208 associates: C-RNTI 1 with TCI state 1 (and PCI 1): C-RNTI 2 with TCI state 2 (and PCI 2); and C-RNTI n with TCI state n (and PCI n).

In some embodiments, the C-RNTI info may be associated with a group of TC states in a manner similar to the C-RNTI configuration 208. For example, a C-RNTI may be associated with a TCI state group that includes a plurality of TC states.

In C-RNTI configuration 212, the C-RNTI information may be configured in a TCI state itself. For example, in addition to the PCI and other TCI state information (as described above), each TCI state may also include a C-RNTI. For example, TCI state 1 may include both PCI 1 and C-RNTI 1, TCI state 2 may include both PCI 2 and C-RNTI 2, and TC state n may include PCI in and C-RNTI n.

In a second option for control signaling, the C-RNTI information for a non-serving cell may be provided by a MAC CE. For example, a separate MAC CE may be used to indicate the C-RNTI information for a PCI, a TCI state, or a group of TC states. Additionally/alternatively, a MAC CE that is used for TCI activation may also indicate C-RNTI information for the activated TCI states.

In a third option for control signaling, the C-RNTI information for a non-serving cell may be provided by DCI. The C-RNTI information may be provided by DCI that is used for TCI indication by including a C-RNTI information field. The C-RNTI information field may only be valid if the TCL corresponding to a non-serving cell RS is indicated. Additionally/alternatively, a separate DCI format may be used to indicate the C-RNTI information for a PCI, TC state, or group of TCI states. The DC may be associated with an RNTI that is configured by higher layer signaling or predefined. For example, the DC may be based on another type of RNTI, which can provide the following information: RNTI info 1: RNTI info 2; . . . RNTI Info N. The base station may tell UE RNTI info X is used for the UE by RRC signaling. The content for the RNTI info may be based on absolute RNTI, differential RNTI, or RNTI offset as described elsewhere herein.

Figure 3:
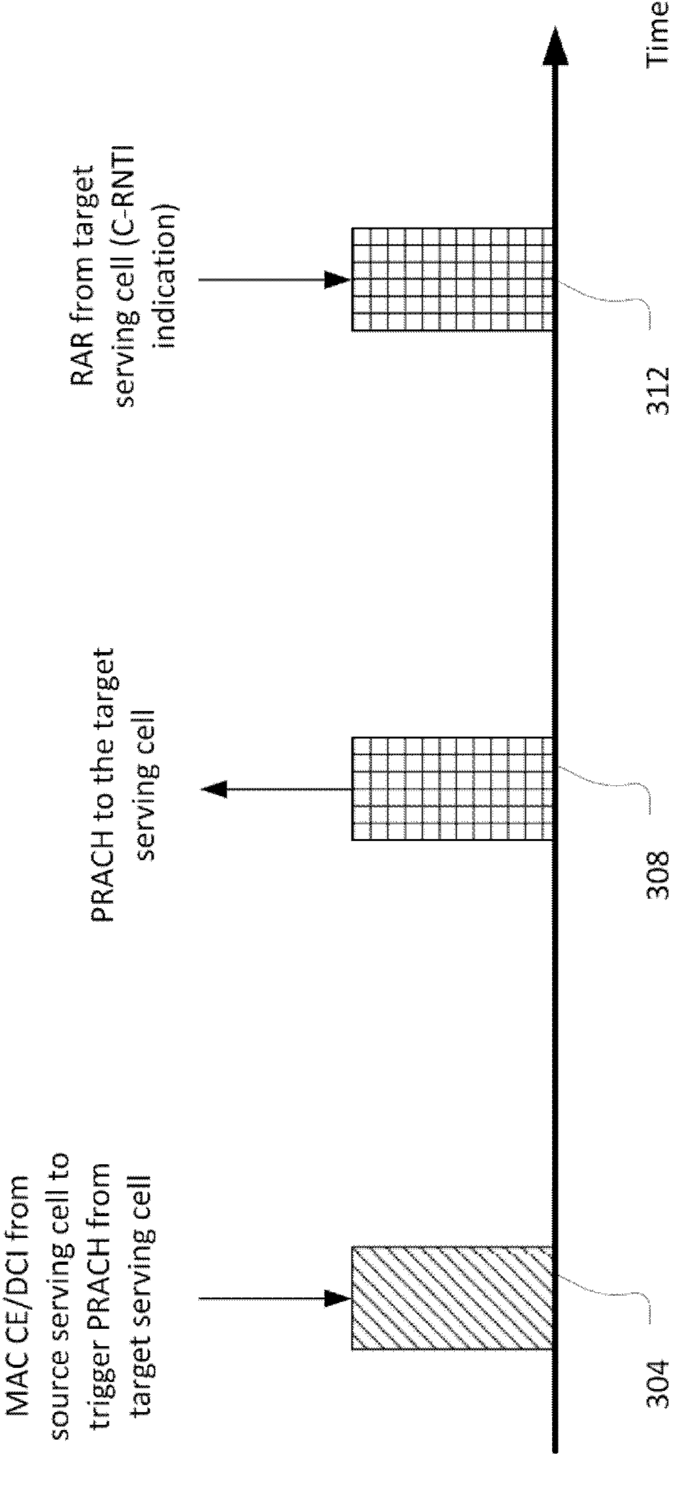
FIG. 3 includes a signaling diagram in accordance with some embodiments.

FIG. 3 is a signaling diagram 300 to illustrate a fourth option for control signaling that may be used for inter-cell mobility in accordance with some embodiments. In the fourth option, a target serving cell may provide a C-RNTI indication based on a MAC CE or DCI transmitted by the source serving cell.

The signaling diagram 300 includes, at 304, the UE 104 receiving a MAC CE or DCI from a source serving cell to trigger a PRACH to a target serving cell. The PRACH message, transmitted to the target serving cell at 308, may be used for synchronization, for example, a timing advance measurement.

The signaling diagram 300 may further include, at 312, the UE 104 receiving a random access response (RAR) from the target serving cell. The RAR may include a C-RNTI indication. For example, the UE 104 may receive the RAR from base station 112 with an indication of CRNTI 2 to be used for signaling in the neighbor cell.

The RAR may be triggered by a PDCCH that may be generated based on the C-RNTI in the source serving cell or based on a random access (RA)-RNTI, which may be counted based on a PRACH resource used by the UE 104 to transmit the PRACH to the target serving cell at 308.

A fifth option for control signaling may be used for multi-DCI based multi-TRP operation in which each TRP transmits its own DCI to schedule its own PDSCH transmissions. In the fifth option, one C-RNTI information may be provided for signals associated with a control resource set (CORESET) pool index.

A CORSET may include resource elements that are used to transmit the PDCCH. A search space configuration may refer to a particular CORESET to define a search space, for example, a specific set of resource blocks and symbols where the UE 104 is to attempt to decode the PDCCH. A base station may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and QCL information to support a successful reception of the PDCCH.

In some embodiments, the gNB 108 may configure one or more CORESET pools to facilitate the use of multiple PDCCHs that may potentially schedule fully or partially overlapped PDSCHs in time. To configure the CORESET pools, a base station may include a CORESET pool index in the ControlResourceSet IE to associate the CORESET with a corresponding CORESET pool. In some embodiments, a base station may configure up to two different CORESET pools, for example, a first CORESET pool for a first cell and a second CORESET pool for a second cell.

The fifth option may leverage the CORESET pool indexes for a point of association with the C-RNTI information. The C-RNTI info for a CORESET pool index may be provided by RRC, MAC CE, or DCI.

If the C-RNTI information for a CORESET pool index is provided by a MAC CE, the MAC CE may be used to provide the C-RNTI information for one CORESET pool index only or for both CORESET pool indexes.

If the C-RNTI information for a CORESET pool indexes provided by DCI, the base station may indicate the C-RNTI in DCI according to the following.

In some embodiments, the DCI may indicate the C-RNTI for the CORESET pool index configured for the CORESET used for the PDCCH transmission that includes the DCI.

In some embodiments, the DCI may indicate a C-RNTI and a swap flag. The swap flag may be one bit. If the flag has a first value, for example, zero, the DCI may indicate the C-RNTI for the CORESET pool index configured for the CORESET used for the PDCCH transmission. If the flag has a second value, for example, one, the DC may indicate the C-RNTI for the other CORESET pool index.

In some embodiments, the DCI may include two C-RNTIs, with each C-RNTI corresponding to a respective CORESET pool index.

Some embodiments describe associating a C-RNTI with uplink or downlink signals. This may be based on whether the uplink/downlink signals include a TCI indication.

For uplink/downlink signals with a TCI indication, the UE 104 can select the C-RNTI corresponding to the indicated TCI or PCI associated with the indicated TCI.

For uplink/downlink signals without a TC indication, for example some CSI-RS resources, two options may be considered. In a first option, the base station may indicate an associated PCI and the C-RNTI corresponding to the PCI should be applied. In a second option, a default C-RNTI or PCI may be assumed. The default C-RNTI/PCI may correspond to a current serving cell.

FIGS. 4-8 include signaling diagrams that illustrate uplink/downlink signal association for contention-based random access (CRBA) procedures in accordance with some embodiments.

Briefly, CBRA procedures may include a four-step procedure or a two-step procedure. In the four-step procedure, the UE 104 may randomly select a preamble from a pool of shared preambles and transmit the preamble to a base station in a first message (Msg 1). In response to the first message, the base station may transmit a RA response in a second message (Msg 2). The RA response may include a random access preamble identifier, timing alignment information, initial uplink grant, and temporary C-RNTI (TC-RNTI). If the UE 104 receives a PDCCH with the RA response within a defined time window, and the RAR includes a preamble identifier that corresponds to the preamble transmitted in Msg 1, the response is successful. The UE 104 may then send a scheduled uplink transmission over a PUSCH in a third message (Msg 3). The third message may include an ID for contention resolution. The base station may send the contention resolution ID in a fourth message (Msg 4) that, if property decoded by the UE 104, may complete the CBRA procedure.

The two-step procedure may include the UE 104 transmitting a first message (Msg A) that includes the preamble and scheduled PUSCH transmission. The base station may respond by sending a second message (Msg B) that includes a random access response and contention resolution ID.

Embodiments describe leveraging the contention resolution aspects of the CBRA procedures to provide C-RNTI information of a neighbor cell. While the signaling diagrams of FIGS. 4-8 describes 4-step CBRA procedures, embodiments may apply equally well to 2-step CBRA procedures.

Figure 4:
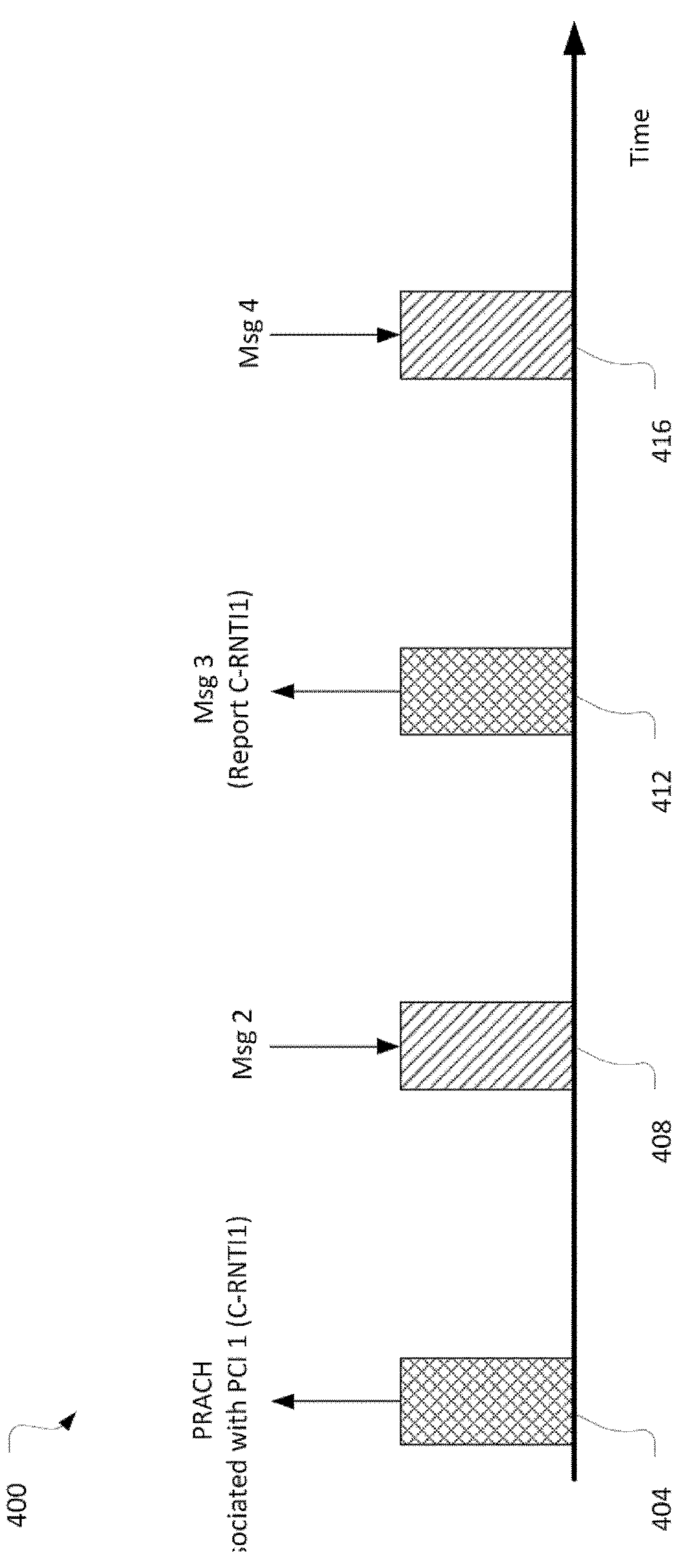
FIG. 4 includes another signaling diagram in accordance with some embodiments.

FIG. 4 illustrates signaling diagram 400 in which the UE 104 only transmits a Msg 3 (or Msg A in 2-step CBRA procedure) by a PUSCH in a single TRP operation in accordance with some embodiments.

The signaling diagram 400 may include, at 404, the UE 104 transmitting a PRACH message associated with PCI 1.

The signaling diagram 400 may further include, at 408, the UE 104 receiving a Msg 2 from the base station.

The signaling diagram 400 may further include, at 412, the IE 104 transmitting Msg 3 with a C-RNTI report. In this option, UE may report only a single C-RNTI in the Msg 3. The C-RNTI reported may be the C-RNTI that is based on the SSB/CSI-RAS associated with the PRACH message, for example, C-RNTI 1.

The signaling diagram 400 may further include, at 416, the UE 104 receiving a Msg 4 from the base station.

Figure 5:
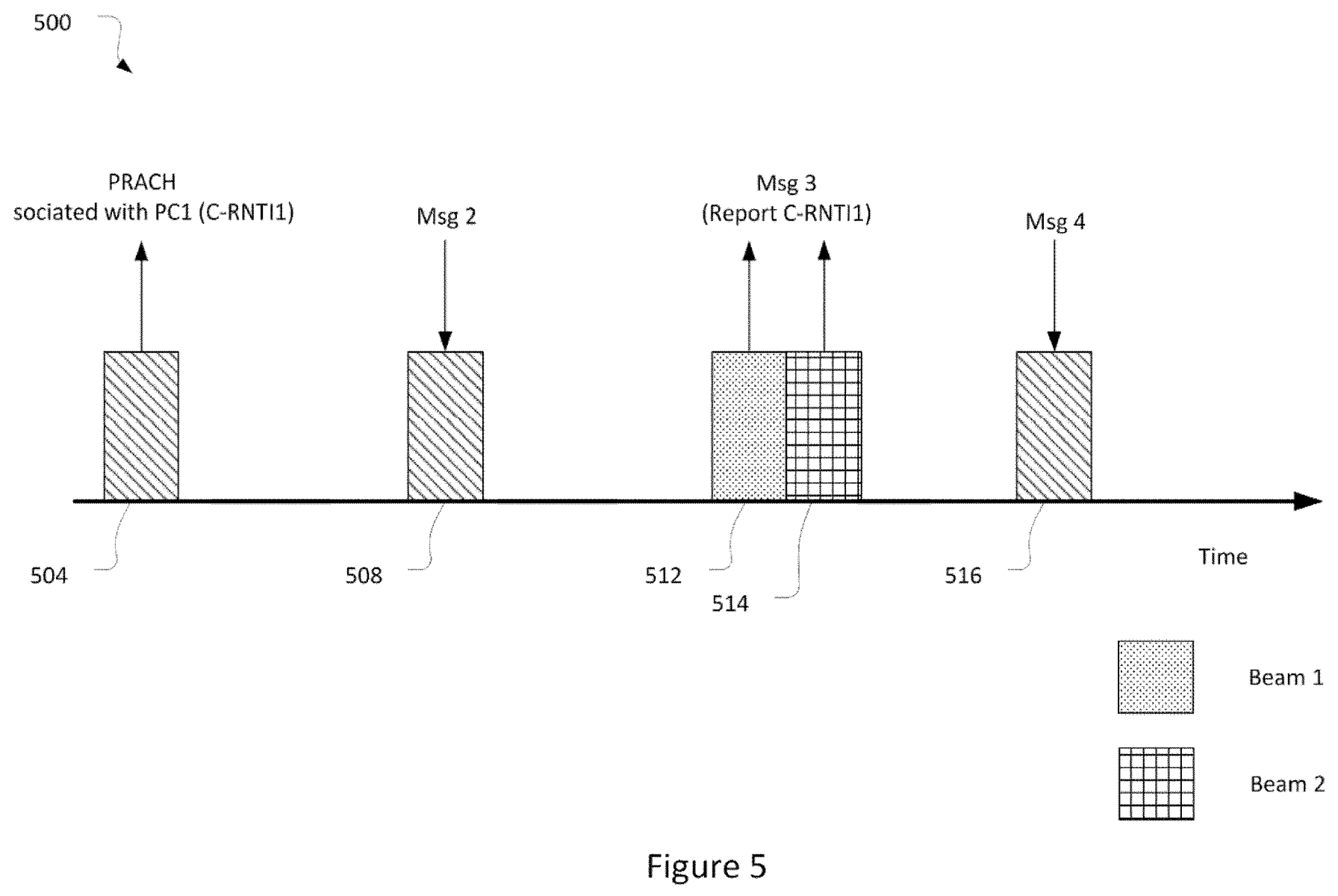

FIG. 5 illustrates a signaling diagram 50M in which the UE 104 can transmit a Msg 3 (or Msg A in 2-step CBRA procedure) in multi-TRP operation in accordance with some embodiments.

The signaling diagram 500 may include a PRACH 504, Msg 2 508, and Msg 4 516 that may be similar to like-named messages of signaling diagram 400. However, in signaling diagram 500, the UE may report a single C-RNTI associated with one PCI in the Msg 3 with two beams, for example, beam 1 at 512 and beam 2 at 514. These two beams may be directed to two TRPs. The PCI with which the C-RNTI is associated may be the PCI associated with the lowest CORESET pool index, minimal PCI ID, the PCI for the current serving cell, or the PCI associated with the PRACH message.

FIG. 6 illustrates another signaling diagram 600 in which the UE 104 can transmit a Msg 3 (or Msg A in 2-step CBRA procedure) in multi-TRP operation in accordance with some embodiments.

The signaling diagram 600 may include a PRACH 604 and Msg 2 608 that may be similar to like-named messages of signaling diagram 400. However, in signaling diagram 600, the UE may report two C-RNTIs (for example, C-RNTI 1 and C-RNTI 2) in the Msg 3. Each of the C-RNTIs may be associated with a respective PCI. The UE 104 may transmit the Msg 3 with two beams, for example, beam 1 at 612 and beam 2 at 614. These two beams may be directed to two TRPs. The Msg 4 (or Msg B in the 2-step CBRA procedure) may send C-RNTI 1 only.

Figure 7:
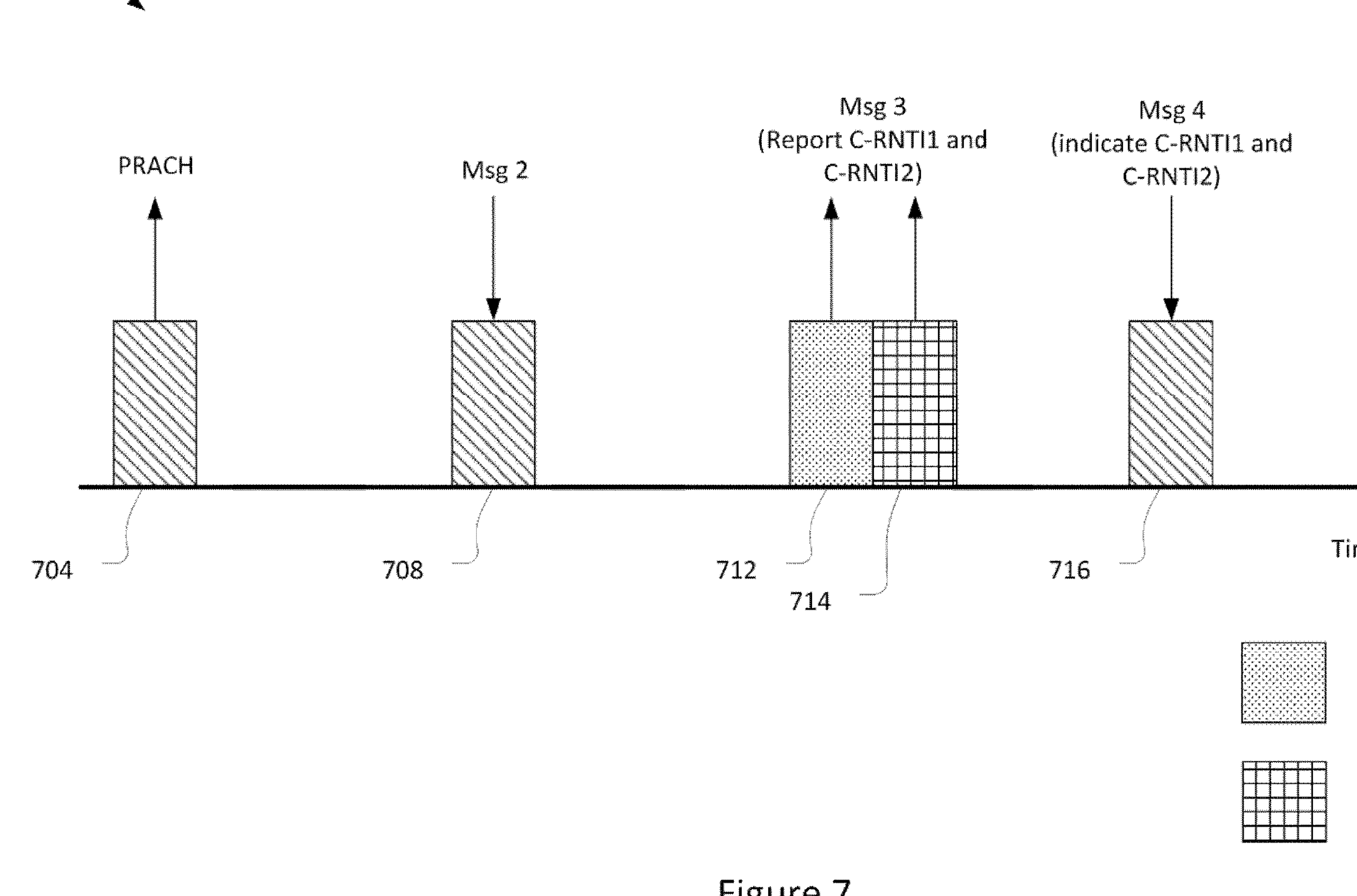
FIG. 7 is another signaling diagram in accordance with some embodiments.

FIG. 7 illustrates another signaling diagram 700 in which the UE 104 can transmit a Msg 3 (or Msg A in 2-step CBRA procedure) in multi-TRP operation in accordance with some embodiments.

The signaling diagram 700 may include a PRACH 704, Msg 2 708, Msg 3 712 and 714 that may be similar to like-named messages of signaling diagram 600. However, instead of only including one C-RNTI in the Msg 4, Msg 4 716 includes two C-RNTIs, for example, C-RNTI 1 and C-RNTI 2.

In some embodiments, the UE 104 may utilize a beam failure recovery (BFR) operation to switch beams from an old cell (for example, PCI 1 with C-RNTI 1) to a new cell (for example, PCI 2 with C-RNTI 2). The UE 104 may transmit a BFR request associated with the new C-RNTI (for example, C-RNTI 2) and receive a BFR response. A number (N) symbols after the UE 104 receives the BFR response, the UE 104 may apply the C-RNTI for a newly identified beam to PDCCH/PUCCH. The number (N) may be 28; however, this is not restrictive. A base station may indicate a C-RNTI for a newly identified beam by RRC signaling. The C-RNTI may be associated with a PRACH resource or a PCI corresponding to the PRACH resource.

Figure 8:
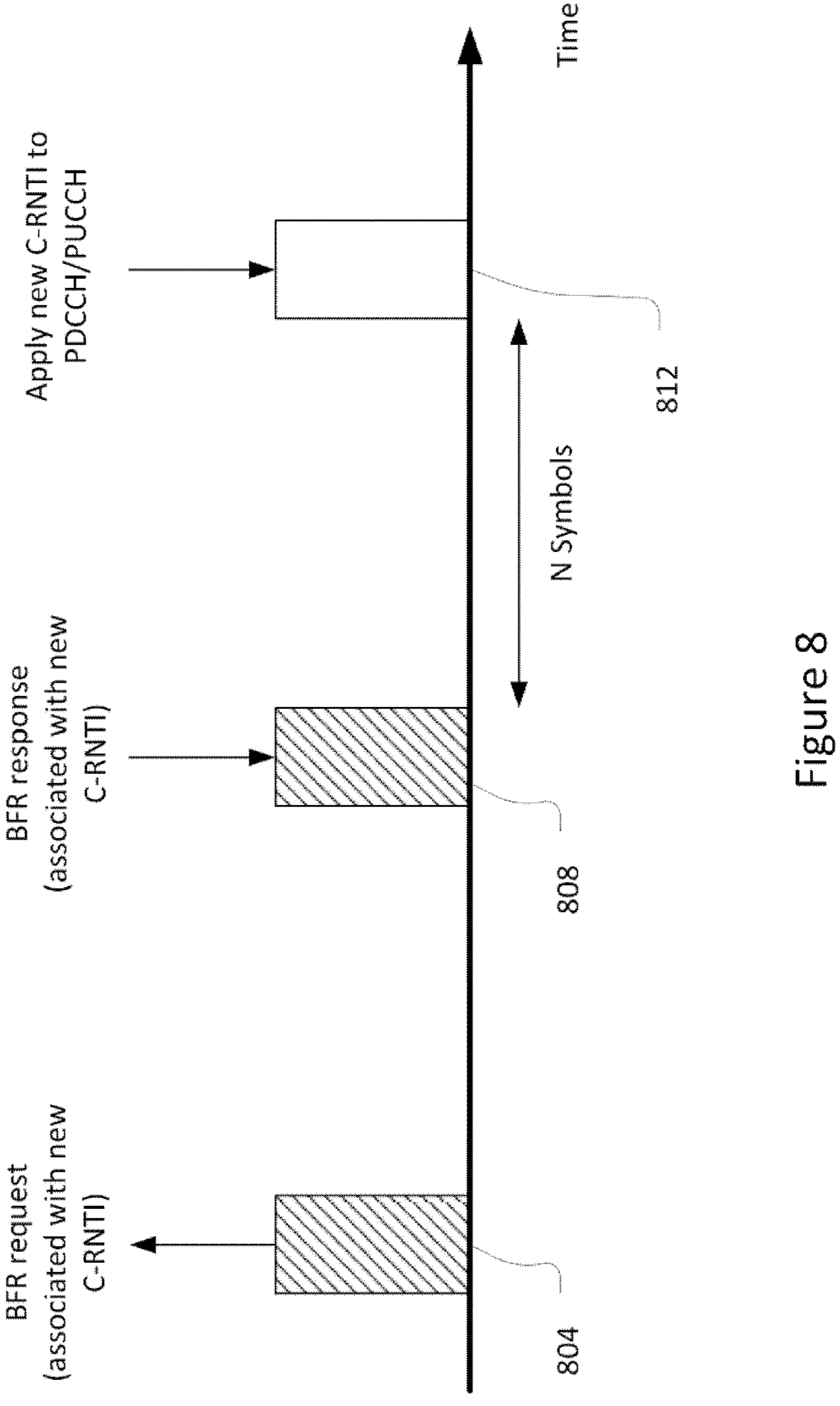
FIG. 8 is another signaling diagram in accordance with some embodiments.

FIG. 8 includes a signaling diagram 800 that illustrates a timing of applying the C-RNTI based on BFR signaling in accordance with some embodiments. The signaling diagram 800 may include the UE 104 transmitting a beam failure recovery (BFR) request at 804. The BFR request may be transmitted to the new cell and may be associated with a new C-RNTI. The UE 104 may then monitor for a BFR response based on the C-RNTI corresponding to the new beam. At 808, the UE 104 may receive, from the new cell, the BFR response, which is associated with the new C-RNTI. N symbols after receiving the BFR response, the LIE 104 may apply the new C-RNTI to PDCCH/PUCCH at 812.

Figure 9:
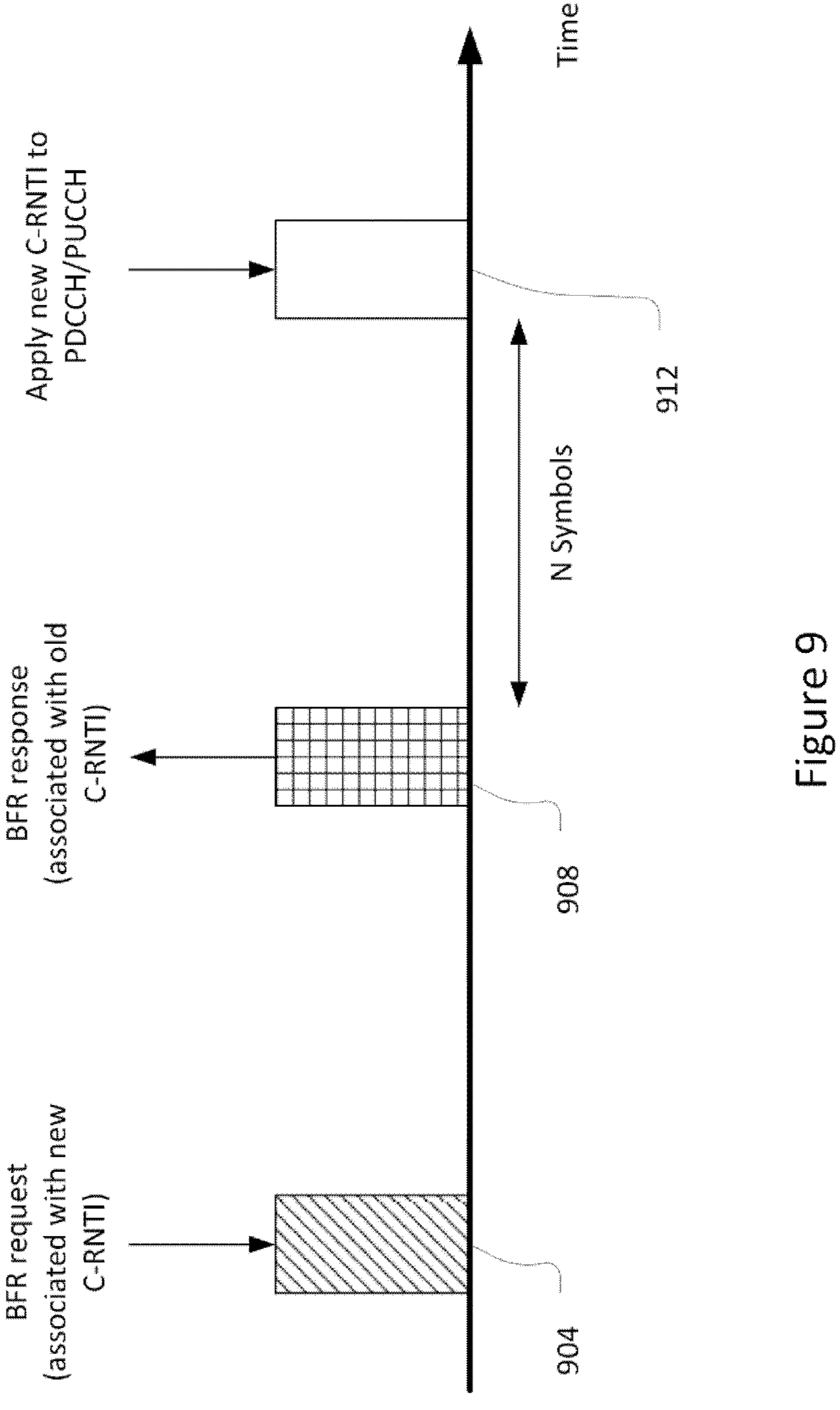
FIG. 9 is another signaling diagram in accordance with some embodiments.

FIG. 9 includes a signaling diagram 900 that illustrates a timing of applying the C-RNTI based on BFR signaling in accordance with additional embodiments. The signaling diagram 900 may include the UE 104 transmitting a BFR request at 804. The BFR request may be transmitted to the old cell and may be associated with the new C-RNTI. In this case, the UE 104 may use the old C-RNTI to monitor for a BFR response. At 808, the UE 104 may receive, from the old cell, the BFR response, which is associated with the old C-RNTI.

In some embodiments, the C-RNTI for the newly identified beam may be indicated by the BFR response. For example, the DCI in the BFR response may indicate the new C-RNTI. In this manner, a base station may tell the UE 104 that it needs to switch C-RNTIs because a new beam is from a new cell. If no new beam is identified in the BFR response, the UE 104 may continue to use the old C-RNTI for PDCCH/PUCCH.

In some embodiments, a newly identified beam and new C-RNTI may be applied to other downlink/uplink channels.

In some situations, a handover procedure may be performed based on RRC signaling. The UE 104 may perform measurements and report layer 3 (L3) results to a serving base station, for example, base station 108. The base station 108 may trigger a handover and the UE 104 may synchronize to a new serving cell provided by base station 112 and complete the handover procedure.

A base station may configure the UE 104 with multiple bandwidth parts (BWPs). A number of RRC parameters may be configured per BWP as defined in section 6.3.2 of 3GPP Technical Specification (TS) 38.331 v16.3.1 (2021 Jan. 7). Some of these RRC parameters that may be configured per BWP include location and bandwidth, cyclic prefix (CP) type, subcarrier spacing, and PDCCH/PDSCH/PUCCH/PUSCH related configurations.

Typically only one downlink and uplink BWP may be activated in a component carrier (CC) at a time. A base station may trigger active BWP switching by DCI or higher layer signaling.

Various embodiments describe a BWP switching framework that may be used for L1/L2 centric inter-cell mobility. Various aspects include control signaling for BWP configuration, control signaling for BWP switching, and UE behavior after BWP switching.

Figure 10:
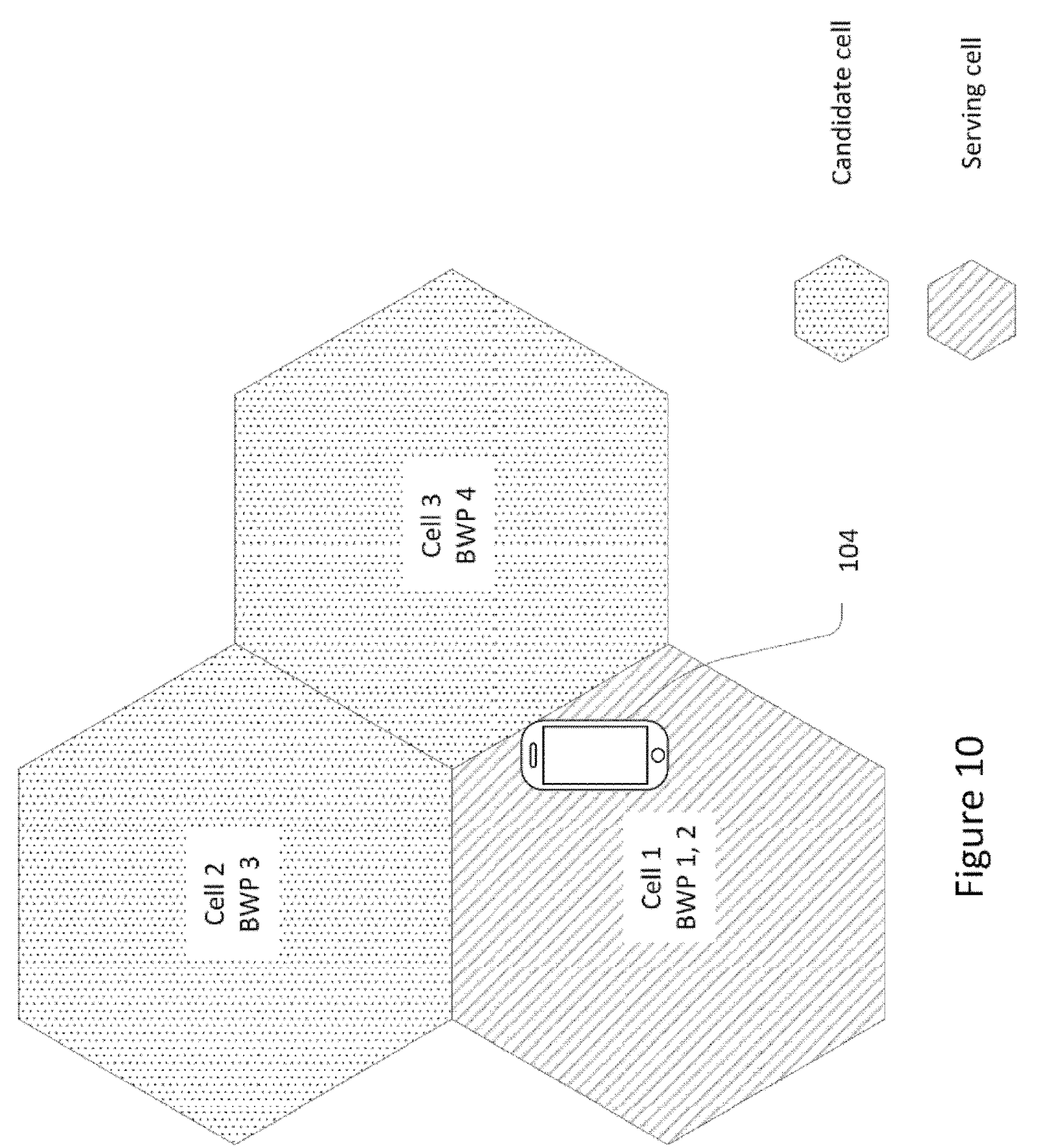
FIG. 10 illustrates another network environment in accordance with some embodiments.

FIG. 10 illustrates a network environment 1000 in accordance with some embodiments. The network environment 1004) shows three cells, cell 1, cell 2, and cell 3. The UE 104 may be located in cell 1, which may be the initial serving cell, while cells 2 and 3 may be candidate cells for handover (for example, neighbor cells).

The UE 104 may be configured with a number of BWPs in a CC. FIG. 1000 shows four BWPs that may be configured for a component carrier (CC). Different BWPs can be configured with different PCIs. As shown, BWPs 1 and 2 may be configured with a PCI of cell 1: BWP 3 may be configured with a PCI of cell 2; and BWP 4 may be configured with a PCI of cell 3.

Configuring the different BWPs with different PCIs may facilitate a lower-layer handover using BWP switching techniques. For example, the cell 1 may determine that the UE 104 is moving toward cell 2. The cell 1 may suggest that the UE 104 switches to BWP 3. The UE 104 may switch to BWP 3 and communicate with cell 2 based on the RRC parameters previously configured for BWP 3. Thus, after the BWP switch, the handover may be completed without requiring additional layer 3 signaling.

A BWP may be configured with a PCI in a number of different ways. For example, a base station may include PCI information in a BWP configuration. If a PCI is not provided in a BWP configuration, the UE 104 may determine that the BWP corresponds to the current serving cell. In another example, the base station may configure the UE 104 with a list of PCIs. The list of PCIs may be configured in a measurement object configuration (for example, MeasObjectNR) that configures the UE 104 for neighbor cell measurements. In each BWP, the index of the PCI list may optionally be provided to associate a PCI with the BWP.

In some embodiments, the network environment may operate under a restriction in which one or more RRC parameters for BWPs that correspond to different cells should be the same. For example, a subcarrier spacing, CP type, or one or more parameters in a BWP-DownlinkCommon/BWP-UplinkCommon may be the same. This may facilitate BWP-based handovers from a serving cell to a neighbor cell.

In embodiments utilizing carrier aggregation, the BWP with the same BWP ID in different CCs in a band or band group may be configured with the same PCI. This may be based on an assumption that PCI is applied for a band/band group, since TCI is applied for all CCs within a band/band group. Thus, the BWP with the same BWP ID within the band/band group may correspond to the same PCI. This may simplify the BWP switching operation in the carrier aggregation case. For example, if a base station asks the UE 104 to switch to BWP 3, then the UE 104 may switch to BWP 3 for all the CCs and this BWP may correspond to the same PCI. This may avoid a situation in which in CC1 the UE 104 is connected with a first cell and in CC2 the UE 104 is connected with a second cell.

In some embodiments, a BWP configured with a PCI may be configured in a band or band group with a primary serving cell (for example, a primary cell (PCell)/primary secondary cell (PSCell)). This may ensure the UE 104 is able to establish communication with the PCell/PSCell upon switching to the BWP.

Figure 11:
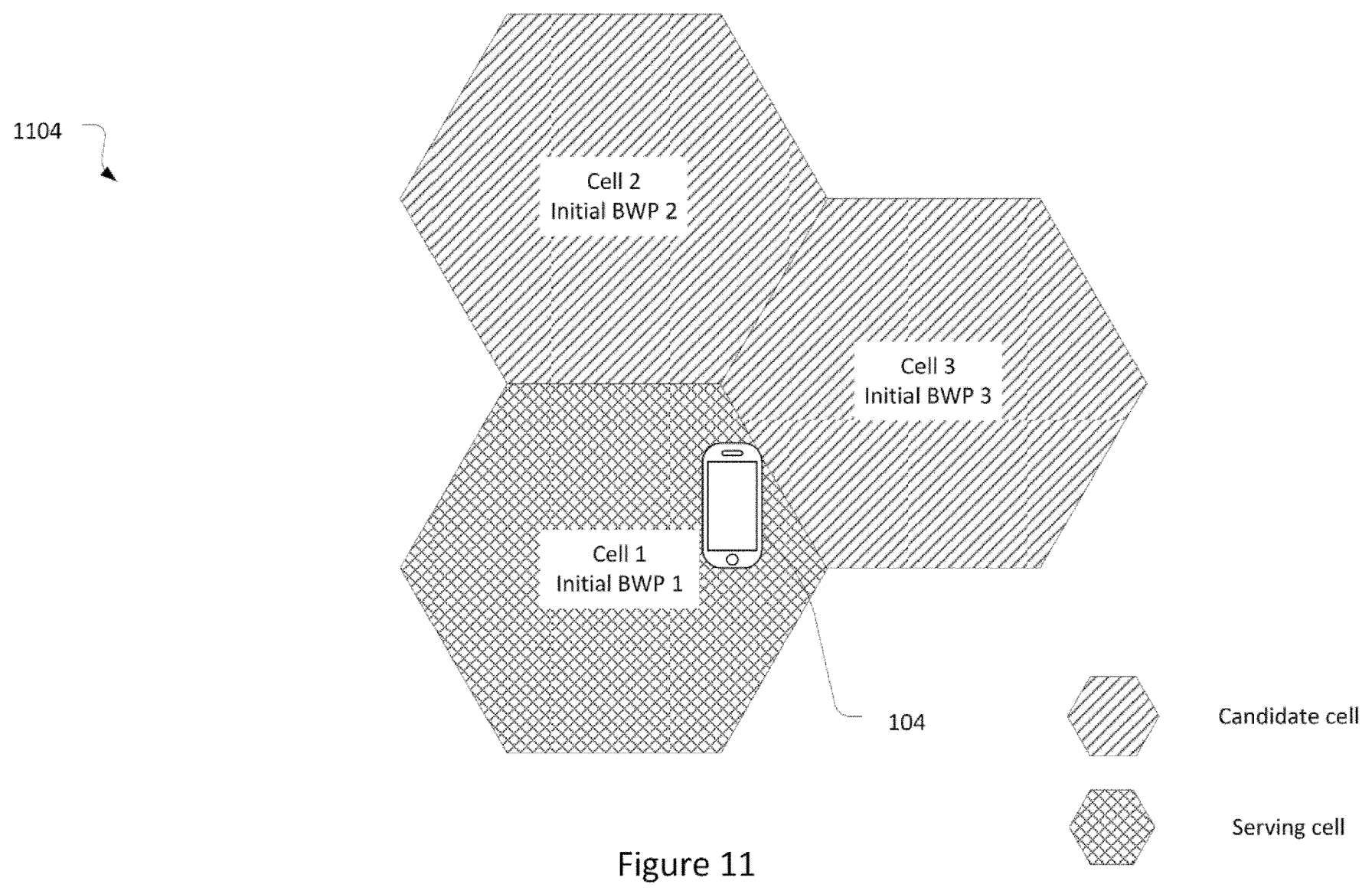

FIG. 11 illustrates a network environment in accordance with some embodiments. The network environment 1100 shows three cells, cell 1, cell 2, and cell 3. The UE 104 may be located in cell 1.

The UE 104 may be configured with initial BWPs that the UE 104 may use when initially accessing a serving cell. The initial uplink/downlink BWPs may be signaled through system information block 1 or dedicated signaling. The initial downlink BWP may be provided by an initialDownlinkBWP parameter and the initial downlink BWP may be provided by an initialUplinkBWP parameter. In some embodiments, different initial BWPs may be configured or associated with different PCIs.

The PCIs for the initial BWPs may be configured similar to that discussed above with respect to FIG. 10. For example, the PCI or reference thereto (for example, index to preconfigured list of PCIs) may be introduced in the initial BWP configurations (for example, in the initialDownlinkBWP parameter or the initialUplinkBWP parameter).

In some embodiments, an initial BWP may be configured only for a primary serving cell (for example, PCell/PSCell).

In some embodiments, the configuration of the initial BWP may not be provided for neighbor cells. In these embodiments, the UE 104 may need to decode the SIB from a corresponding cell to derive the initial BWP related configuration. To accommodate this, a larger delay may be provided for BWP switching based on inter-cell switching. For example, an offset may be added to the N slot delay shown in FIGS. 12 and 13.

In some embodiments, the UE 104 may assume an initial BWP configuration for all candidate cells is the same as a reference configuration if it is not specifically configured otherwise. The reference configuration may be a default initial BWP configuration or a serving cell initial BWP configuration.

The BWP switching signal for a BWP associated with a PCI of a non-serving cell may be applied for the CCs within a band or band group. The BWP switching may be facilitated by associating a TC state with a BWP ID or serving/non-serving cell.

Figure 12:
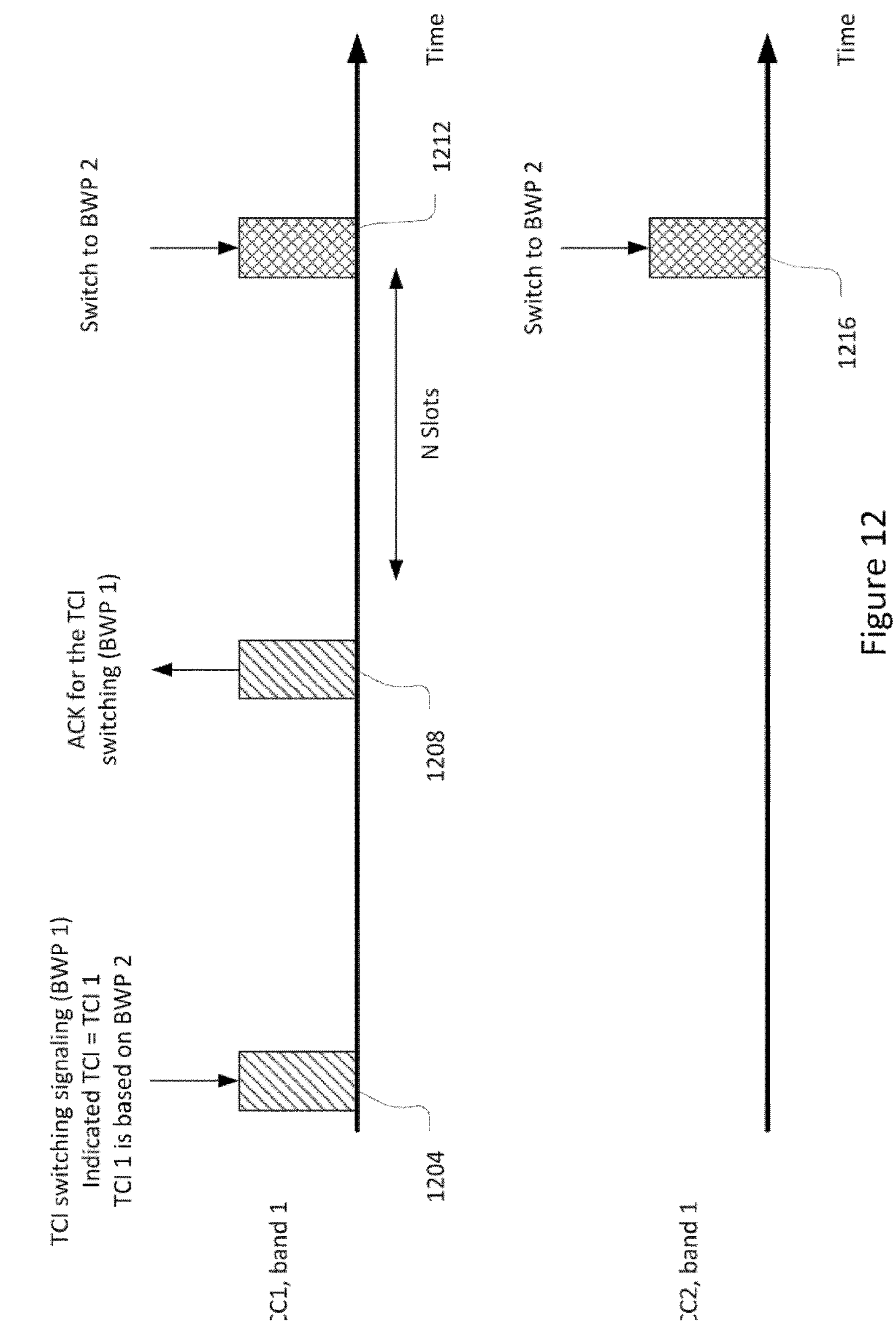
FIG. 12 is another signaling diagram in accordance with some embodiments.

FIG. 12 is a signaling diagram 12(*g*) that illustrates control signaling for BWP switching in accordance with some embodiments. The signaling diagram 1200 describes a BWP switching operation in which a BWP ID is configured in, or otherwise associated with, a TCI state.

The signaling diagram 1200 may include, at 1204, the UE 104 receiving a TCI switching signal. The TCI switching signal may be received in BWP 1, from a first cell, and may indicate a TCI. TCI 1 may be based on, or otherwise associated with, BWP 2. The TCI indication may be by PDCCH or MAC CE.

The signaling diagram 1200 may further include, at 1208, the UE 104 transmitting an acknowledgment for the TC switching signal. The acknowledgment may be sent in BWP 1 to the first cell.

N slots after the UE reports the acknowledgment at 1208, the UE 104 may switch to the corresponding BWP for all the CCs within the band or band group. For example, as shown, the UE 104 may switch to BWP 2 for CC1 in band 1 at 1212 and for CC2 in band 1 at 1216. Tn some embodiments, the switch may be performed N slots after receiving the TCI indication at 1204.

A minimal value of N may be reported by the UE 104 in capability signaling. The value of N may be configured by higher-layer signaling, for example, RRC or MAC CE, or may be indicated in DCI. In some embodiments, the value of N may be based on a minimum/maximum subcarrier spacing across CCs.

In some embodiments, the UE 104 may ignore a legacy BWP ID in DC if the TCI is indicated by DCI, or predefined value may be provided for the BWP ID in DCI for validation. If we bind the PCI and BWP with a 1-to-1 mapping, based on TC indication, we can get the PCI as well as new BWP information. Then it may not be necessary to use legacy BWP ID. This may work with 1-to-1 mapping. With 1-to-N mapping, where one PCI can be associated with N BWPs, the BWP ID in DCI may need to be re-interpreted, which should be based on the N BWPs associated with the PCI corresponding to the indicated TCI.

Figure 13:
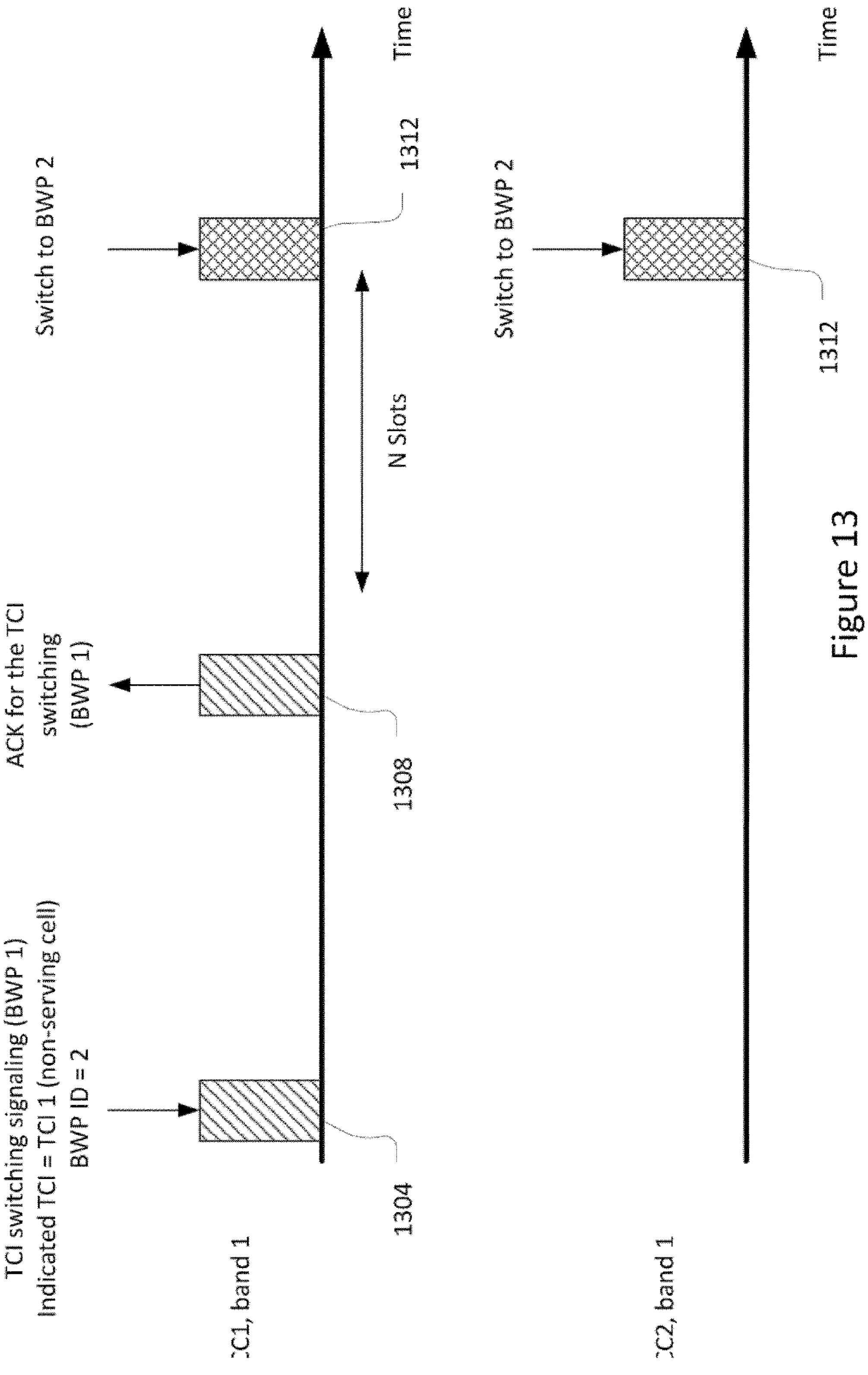
FIG. 13 is another signaling diagram in accordance with some embodiments.

FIG. 13 is a signaling diagram 1300 that illustrates control signaling for BWP switching in accordance with some embodiments. The signaling diagram 1300 describes a BWP switching operation in which a base station may configure a TCI state with an indication of whether it is associated with a serving cell or a non-serving cell. If the indicated TCI's associated with a non-serving cell, as provided in TCI switching signal 1304, the BWP ID indicated in the DCI can indicate a BWP configured with a PCI for a different serving cell. The signaling diagram 130X) may then include the acknowledgment for the DC switching at 1308 and the switch, after N slots, to BWP 2 for CC1 at 1312 and CC2 at 1316 similar to that discussed above with respect to FIG. 12.

If the indicated TC is associated with a serving cell, the BWP ID indicated in the DCI can indicate a BWP configured for the current serving cell.

If the TC indication is a MAC CE, the BWP ID can be introduced. In this way, only MAC CE can be used for TCI indication, rather than relying on both DCI and MAC CE for TCI indication.

If the UE 104 is configured for carrier aggregation operation, its behavior after the BWP switching may consistent with one or more of the following three options.

In a first option, the UE 104 may continue to maintain the communication for the CCs in a same band or band group with the new BWP. The UE 104 may deactivate the CCs in the other bands or band groups. In a second option, the UE 104 may continue to maintain the communication for the primary serving cell (for example, the PCell/PSCell) only for the new BWP. The UE 104 may deactivate other CCs.

In a third option, the UE 104 may continue to maintain the communication for all CCs, the UE 104 may start to communicate with the new serving cell in the new BWP in the CCs in a band or band group. For the other band or band group, the UE 104 may still maintain the communication with the old serving cell based on the old BWP configuration.

The UE 104 may report its capability on which of the three options it supports. The base station may indicate the option to use by higher-layer signaling, for example RRC or MAC CE, or by DCI, for example the DCI used for TC switching.

After the UE 104 switches to a new BWP, the UE 104 may fall back to an initial BWP. This may happen if the UE 104 does not receive a communication in the new BWP for a certain period of time. The UE 104 may fall back to an initial BWP corresponding to the same PCI as that associated with the new BWP or may fall back to the initial BWP corresponding to the old serving cell. In some embodiments, the base station may indicate whether the UE 104 is to fall back to the initial BWP corresponding to the new PCI or the old PCI by higher layer signaling, for example, RRC or MAC CE, or DCI, for example DC used for TC switching.

After the UE 104 switches to the new BWP, the BWP ID may be updated in the DCI. In previous networks, a base station may not be allowed to indicate a BWP ID of a neighbor cell. However in the present embodiments, upon switching to the new BWP, the neighbor cell becomes the serving cell. Thus, there is ambiguity as to how the BWP ID of the DCI is to be selected. In a first option, the BWP ID in the DCI may correspond to the BWP's associated with the new PCI. In a second option, the BWP ID in the DCI may correspond to the BWPs associated with the old serving cell. The base station may indicate whether to use the first or second option by higher layer signaling, for example, RRC or MAC CE, or DCI, for example, the DCI used for TCI switching.

Figure 14:
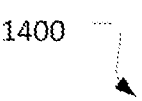
FIG. 14 illustrates an operational flow/algorithmic structure in accordance with some embodiments.
Figure 14:
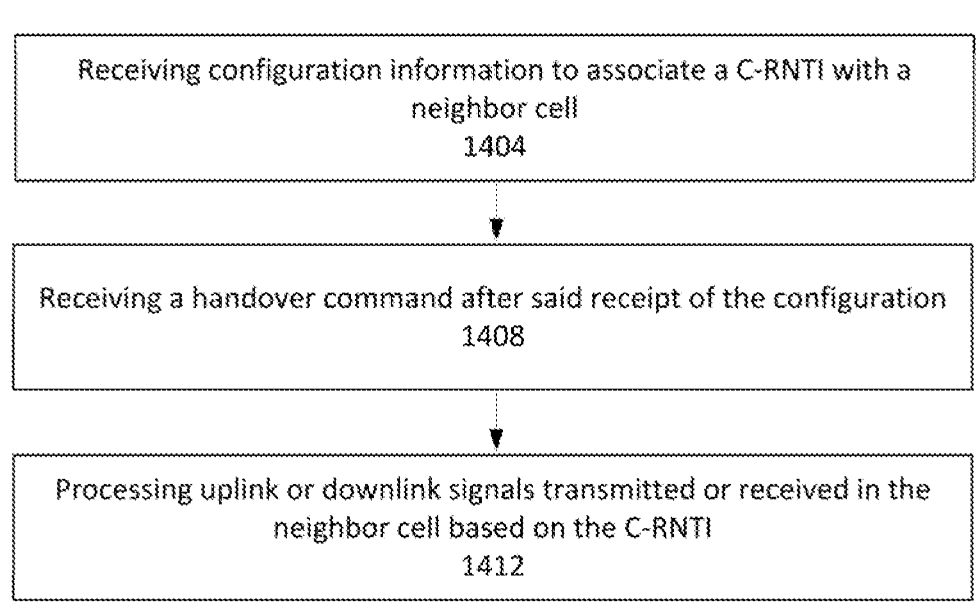

FIG. 14 illustrates an operation flow/algorithmic structure 1400 in accordance with some embodiments. The operation flow/algorithmic structure 1400 may be performed or implemented by a UE such as, for example, U E 104 or UE 1600; or components thereof, for example, baseband processor 1604A.

The operation flow/algorithmic structure 1400 may include, at 1404, receiving configuration information to associate a C-RNTI with a neighbor cell. For example, the UE 104 may be initially coupled with the serving cell provided by base station 108. The UE 104 may receive configuration information from the base station 108 that associates C-RNTI 2 with a PCI 2 of the base station 112. The configuration information may include an absolute value of the C-RNTI; a differential value that may be used with the C-RNTI of the serving cell to determine the C-RNTI of the neighbor cell; or an offset value that may be used with the C-RNTI for the serving cell and a UE identifier to determine the C-RNTI of the neighbor cell.

The configuration information may be transmitted by RRC. MAC, or DCI signaling.

The operation flow/algorithmic structure 1400 may further include, at 1408, receiving a handover command after said receipt of the configuration at 1404. In some embodiments, the handover command may be a lower layer (for example, L1 or L2) handover command.

The operation flow/algorithmic structure 1400 may further include, at 1412, processing uplink or downlink signals transmitted or received in the neighbor cell based on the C-RNTI. For example, the UE 104 may use C-RNTI 2 to transmit/receive signals to/from base station 112. The neighbor cell may become the serving cell and the handover may complete.

Figure 15:
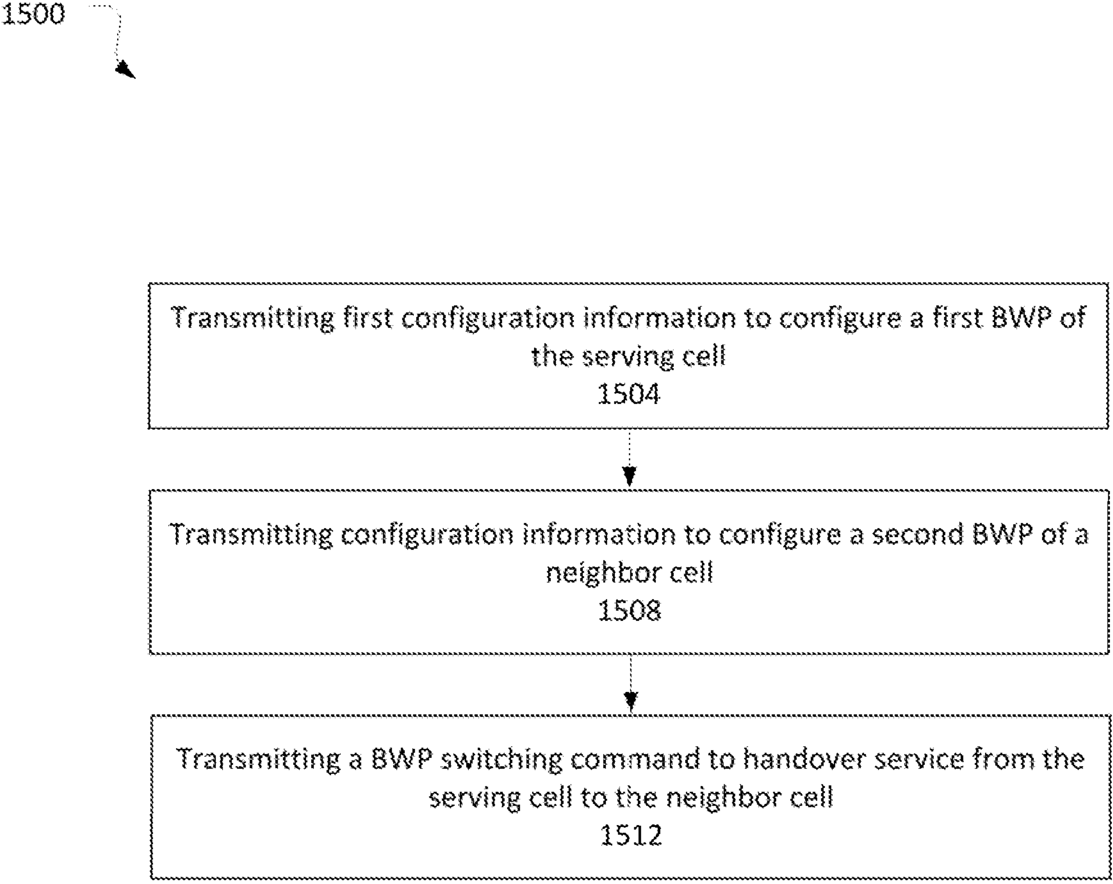
FIG. 15 illustrates another operational flow/algorithmic structure in accordance with some embodiments.

FIG. 15 illustrates an operation flow/algorithmic structure 1500 in accordance with some embodiments. The operation flow/algorithmic structure 150 may be performed or implemented by a base station such as, for example, base station 108 or base station 1700; or components thereof, for example, baseband processor 1704A.

The operation flow/algorithmic structure 1500 may include, at 1504, transmitting first configuration information to configure a first BWP of a serving cell. The configuration of the first BWP for the serving cell may include a number of RRC parameters including, for example, location bandwidth. CP type, subcarrier space, and PDCCH/PDSCH/PUCCH/PUSCH related configurations. In some embodiments, the configuration may also include a PCI that is associated with the first BWP. However, if a PCI is not included, the LIE 104 may determine that the BWP is associated with the current serving cell.

The operation flow/algorithmic structure 1500 may further include, at 1508, transmitting configuration information to configure a second BWP of a neighbor cell. The configuration of the second BWP for the neighbor cell may include a number of RRC parameters such as those described above with respect to the first BWP. Some of these parameters may be common between the first and second BWP. The configuration of the second BWP may also include a neighbor-cell PCI that is associated with the second BWP.

In some embodiments, the first and second BWPs configured at 1504 and 1508 may be initial downlink/uplink BWPs.

The operation flow/algorithmic structure 1500 may further include, at 1512, transmitting a BWP switching command to handover service from the serving cell to the neighbor cell. In some embodiments, the BWP switching command may be a TCI switching signal to indicate a TC state that is associated with the second BWP.

Figure 16:
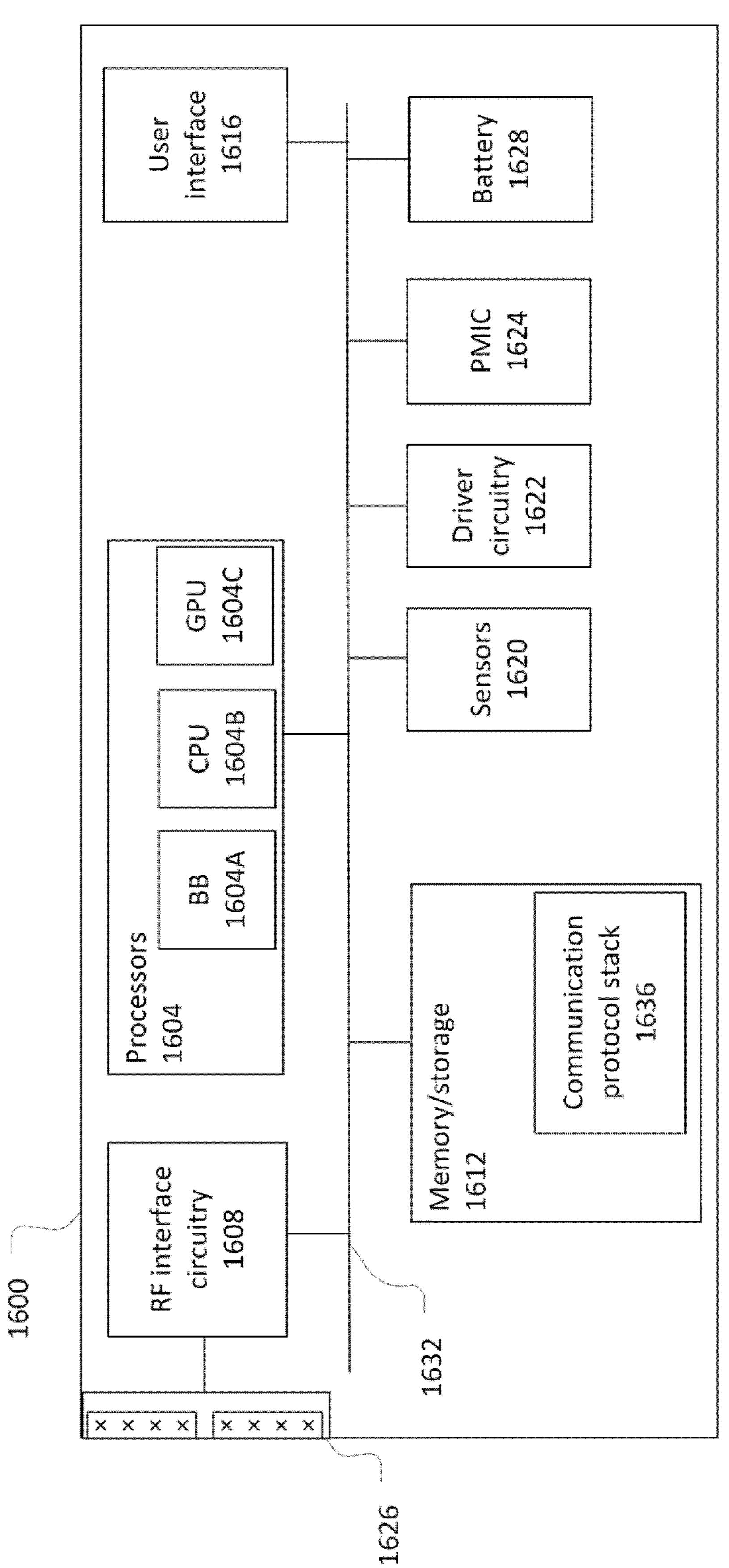
FIG. 16 illustrates a user equipment in accordance with some embodiments.

FIG. 16 illustrates a UE 1600 in accordance with some embodiments. The UE 1600 may be similar to and substantially interchangeable with UE 104 of FIG. 1.

The UE 1600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1600 may include processors 1604, RF interface circuitry 1608, memory/storage 1612, user interface 1616, sensors 1620, driver circuitry 1622, power management integrated circuit (PMIC) 1624, antenna structure 1626, and battery 1628. The components of the UE 1600 may be implemented as integrated circuits (ICs), portions thereof, discrete electronic devices, or other modules, logic, hardware, software, firmware, or a combination thereof. The block diagram of FIG. 16 is intended to show a high-level view of some of the components of the UE 1600. However, some of the components shown may be omitted, additional components may be present, and different arrangement of the components shown may occur in other implementations.

The components of the UE 1600 may be coupled with various other components over one or more interconnects 1632, which may represent any type of interface, input/output, bus (local, system, or expansion), transmission line, trace, optical connection, etc. that allows various circuit components (on common or different chips or chipsets) to interact with one another.

The processors 1604 may include processor circuitry such as, for example, baseband processor circuitry (BB) 1604A, central processor unit circuitry (CPU) 16048, and graphics processor unit circuitry (GPU) 1604C. The processors 1604 may include any type of circuitry or processor circuitry that executes or otherwise operates computer-executable instructions, such as program code, software modules, or functional processes from memory/storage 1612 to cause the UE 1600 to perform operations as described herein.

In some embodiments, the baseband processor circuitry 1604A may access a communication protocol stack 1636 in the memory/storage 1612 to communicate over a 3GPP compatible network. In general, the baseband processor circuitry 1604A may access the communication protocol stack to: perform user plane functions at a PHY layer, MAC layer, RLC layer. PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1608.

The baseband processor circuitry 1604A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1612 may include one or more non-transitory, computer-readable media that includes instructions (for example, communication protocol stack 1636) that may be executed by one or more of the processors 1604 to cause the UE 1600 to perform various operations described herein.

The memory/storage 1612 include any type of volatile or non-volatile memory that may be distributed throughout the UE 1600. In some embodiments, some of the memory/storage 1612 may be located on the processors 1604 themselves (for example, L1 and L2 cache), while other memory/storage 1612 is external to the processors 1604 but accessible thereto via a memory interface. The memory/storage 1612 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1608 may include transceiver circuitry and radio frequency front module (RFEM) that allows the UE 1600 to communicate with other devices over a radio access network. The RF interface circuitry 1608 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1626 and proceed to filter and amplify (with a low-noise amplifier) the signal. The signal may be provided to a receiver of the transceiver that down-converts the RF signal into a baseband signal that is provided to the baseband processor of the processors 1604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1626.

In various embodiments, the RF interface circuitry 1608 may be configured to transmit/receive signals in a manner compatible with NR access technologies.

The antenna 1626 may include antenna elements to convert electrical signals into radio waves to travel through the air and to convert received radio waves into electrical signals. The antenna elements may be arranged into one or more antenna panels. The antenna 1626 may have antenna panels that are omnidirectional, directional, or a combination thereof to enable beamforming and multiple input, multiple output communications. The antenna 1626 may include microstrip antennas, printed antennas fabricated on the surface of one or more printed circuit boards, patch antennas, phased array antennas, etc. The antenna 1626 may have one or more panels designed for specific frequency bands including bands in FR1 or FR2.

The user interface circuitry 1616 includes various input/output (I/O) devices designed to enable user interaction with the UE 160). The user interface 1616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1620 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices: etc.

The driver circuitry 1622 may include software and hardware elements that operate to control particular devices that are embedded in the UE 1600, attached to the UE 1100, or otherwise communicatively coupled with the UE 1600. The driver circuitry 1622 may include individual drivers allowing other components to interact with or control various input/output (I/O) devices that may be present within, or connected to, the UE 1600. For example, driver circuitry 1622 may include a display driver to control and allow access to a display device, a touchscreen driver to control and allow access to a touchscreen interface, sensor drivers to obtain sensor readings of sensor circuitry 1620 and control and allow access to sensor circuitry 1620, drivers to obtain actuator positions of electro-mechanic components or control and allow access to the electro-mechanic components, a camera driver to control and allow access to an embedded image capture device, audio drivers to control and allow access to one or more audio devices.

The PMIC 1624 may manage power provided to various components of the UTE 1600. In particular, with respect to the processors 1604, the PMIC 1624 may control power-source selection, voltage scaling, battery charging, or DC-to-DC conversion.

In some embodiments, the PMIC 1624 may control, or otherwise be part of, various power saving mechanisms of the UE 1600 including DRX as discussed herein.

A battery 1628 may power the UE 1600, although in some examples the UE 1600 may be mounted deployed in a fixed location, and may have a power supply coupled to an electrical grid. The battery 1628 may be a lithium ion battery, a metal-air battery, such as a zinc-air battery, an aluminum-air battery, a lithium-air battery, and the like. In some implementations, such as in vehicle-based applications, the battery 1628 may be a typical lead-acid automotive battery.

Figure 17:
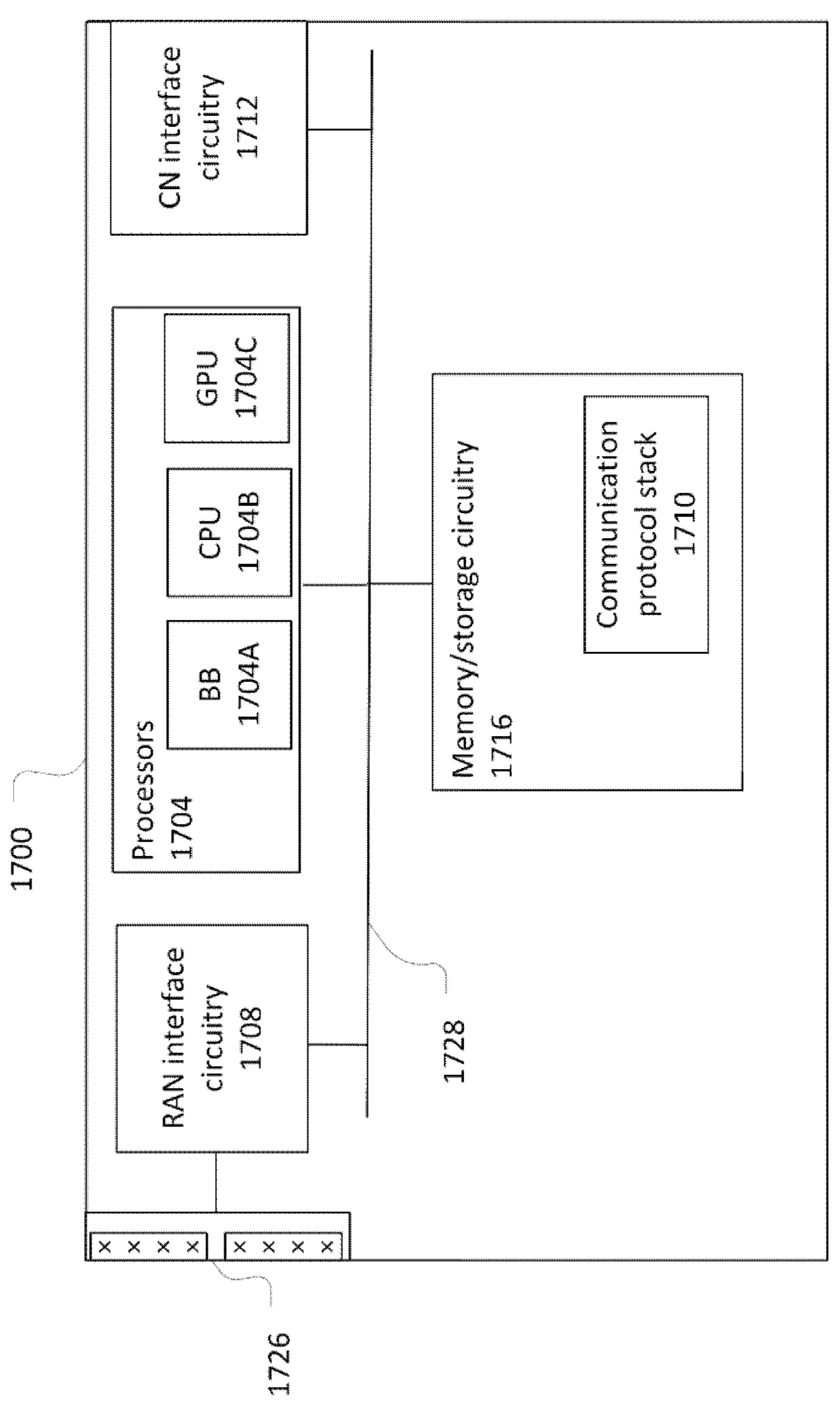
FIG. 17 illustrates a base station in accordance with some embodiments.

FIG. 17 illustrates a base station 1700 in accordance with some embodiments. The base station 1700 may similar to and substantially interchangeable with base stations 108/112 of FIG. 1.

The base station 1700) may include processors 1704, RF interface circuitry 1708, core network "CN" interface circuitry 1712, memory/storage circuitry 1716, and antenna structure 1726.

The components of the base station 1700 may be coupled with various other components over one or more interconnects 1728.

The processors 1704, RF interface circuitry 1708, memory/storage circuitry 1716 (including communication protocol stack 1710), antenna structure 1726, and interconnects 1728 may be similar to like-named elements shown and described with respect to FIG. 16.

The CN interface circuitry 1712 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1700 via a fiber optic or wireless backhaul. The CN interface circuitry 1712 may include one or more dedicated processors or FPGAs to communicate using one or more of the aforementioned protocols. In some implementations, the CN interface circuitry 1712 may include multiple controllers to provide connectivity to other networks using the same or different protocols.

In some embodiments, the base station 1700 may be coupled with TRPs using the antenna structure 1726, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: receiving, from a serving cell, configuration information to associate a cell-radio network temporary identifier (C-RNTI) with a neighbor cell; receiving, after said receipt of the configuration, a handover command based on a transmission configuration indicator (TCI) or lower-layer signaling, wherein the lower layer signaling includes layer 1 or layer 2 signaling; and processing uplink or downlink signals transmitted or received in the neighbor cell based on the C-RNTI.

Example 2 includes the method of example 1 or some other example herein, wherein the configuration information is to provide an absolute value of the C-RNTI.

Example 3 includes the method of example 1 or some other example herein, wherein the C-RNTI is a first C-RNTI, the configuration information is to provide a differential value, and the method further comprises: determining the first C-RNTI based on the differential value and a second C-RNTI that is associated with the serving cell.

Example 4 includes the method of example 1 or some other example herein, wherein the C-RNTI is a first C-RNTI, the configuration information includes a second C-RNTI associated with the serving cell, and the method further comprises: determining an offset value based on the second C-RNTI associated with a serving cell and an identity value, wherein the identity value is a UE identity or a value configured by radio resource control (RRC) signaling.

Example 5 includes the method of example 1 or some other example herein, further comprising: receiving the configuration information via radio resource control (RRC) signaling, wherein the configuration information is to configure a list of physical cell identities (PCIs), wherein individual PCIs are associated with one or more C-RNTIs; and receiving downlink control information (DCI) to provide an indication between one PCI and one C-RNTI.

Example 6 includes the method of example 1 or some other example herein, wherein the configuration information associates the C-RNTI with a physical cell identity (PCI) or one or more transmission configuration indicator (TCI) states and is received by radio resource control (RRC) signaling, media access control (MAC) control element (CE), or downlink control information (DCI).

Example 7 includes the method of example 6 or some other example herein, wherein the configuration information is: received by a MAC CE that activates one or more TC states, and the MAC CE includes C-RNTIs associated with individual TCI states of the one or more TC states; or received by DCI that includes a field to indicate a first TC state that is associated with the C-RNTI or is of a DCI format to indicate the C-RNTI is associated with the PCI or one or more TC states.

Example 8 includes a method of operating a base station, the method comprising: providing a serving cell for a user equipment (UE); transmitting, to the UE through the serving cell, configuration information to associate a cell-radio network temporary identifier (C-RNTI) with a neighbor cell, and transmitting a handover command to the UE to handover service to the neighbor cell.

Example 9 includes the method of example 8 or some other example herein, wherein the configuration information is to provide an absolute value of the C-RNTI.

Example 10 includes the method of example 8 or some other example herein, wherein the C-RNTI is a first C-RNTI, and the configuration information is to provide a differential value for determining the first C-RNTI based on a second C-RNTI that is associated with the serving cell.

Example 11 includes the method of example 8 or some other example herein, further comprising: transmitting the configuration information via radio resource control (RRC) signaling, wherein the configuration information is to configure a list of physical cell identities (PCIs), wherein individual PCIs are associated with one or more C-RNTIs; and transmitting downlink control information (DCI) to provide an indication between one PCI and one C-RNTI.

Example 12 includes a method comprising: detecting a trigger to perform a physical random access channel (PRACH) process based on a signal from a source serving cell; transmitting, based on said detecting of the trigger, a PRACH message to a target serving cell; and receiving a random access response (RAR) from the target serving cell, the RAR to include an indication of a cell-radio network temporary identifier (C-RNTI) of the target serving cell.

Example 13 includes the method of example 12 or some other example herein, further comprising: receiving the RAR in a physical downlink control channel based on a C-RNTI of the source serving cell.

Example 14 includes the method of example 12 or some other example herein, further comprising: receiving the RAR in a physical downlink control channel based on a random access-radio network temporary identifier (RA-RNTI).

Example 15 includes the method of example 14 or some other example herein, further comprising: determining the RA-RNTI based on a resource used for the PRACH message.

Example 16 includes the method of example 12 or some other example herein, wherein the signal is a media access control (MAC control element (CE) or downlink control information (DC).

Example 17 includes the method of operating a UE, the method comprising: storing control resource set (CORESET) information to configure a first CORESET pool for a first transmit-receive point (TRP) and a second CORESET pool for a second TRP; receiving configuration information to associate a first cell-radio network temporary identifier (C-RNTI) with the first CORESET pool; identifying a CORESET of the first CORESET pool that is to be used for a physical downlink control channel (PDCCH) transmission; and receiving the PDCCH transmission from the first TRP based on the first C-RNTI.

Example 18 includes the method of example 17 or some other example herein, further comprising receiving the configuration information by radio resource control (RRC) signaling, media access control (MAC) control element (CE), or downlink control information (DCI).

Example 19 includes the method of example 18 or some other example herein, further comprising receiving the configuration information by MAC CE, wherein the MAC CE is to associate the first C-RNTI with the first CORESET pool and is to further associate a second C-RNTI with the second CORESET pool.

Example 20 includes the method of example 11 or some other example herein, further comprising receiving the configuration information by DCI, wherein the DCI is transmitted by the first TRP.

Example 21 includes the method of example 18 or some other example herein, further comprising receiving the configuration information by DCI, wherein the DCI includes a flag to indicate whether the C-RNTI is associated with a same CORESET pool as the DCI.

Example 22 includes the method of example 18 or some other example herein, wherein the configuration information is to further associate a second C-RNTI with the second CORESET pool and the method further comprises receiving the configuration information by DCI.

Example 23 includes the method comprising: establishing communication with a first and second serving cells; receiving configuration information to associate a first cell-radio network temporary identifier (C-RNTI) with the first serving cell and to associate a second C-RNTI with the second serving cell; identifying a selected C-RNTI from the first C-RNTI and the second C-RNTI based on a transmission configuration indicator (TCI) indication, a physical cell identifier (PCI) indication, or a default configuration; and processing uplink or downlink signals based on the selected C-RNTI.

Example 24 includes the method of example 23 or some other example herein, wherein identifying the selected C-RNTI is based on the default configuration, wherein default configuration is to select whichever of the first or second C-RNTI is associated with a current serving cell.

Example 25 includes the method of example 23 or some other example herein, wherein the uplink or downlink signals include a TC indication and said identifying the selected C-RNTI is based on a TO indicated by the TCI indication or a PCI associated with the TCI.

Example 26 includes the method comprising: transmitting a first physical random access channel (PRACH) message of a contention-based random access (CBRA) procedure, the first PRACH message associated with a first physical cell identity (PCI); receiving a second PRACH message in response to the first PRACH message; and transmitting the third PRACH message with a first beam to a first transmit-receive point (TRP) and with a second beam, the third PRACH message to report a first cell-radio network temporary identifier (C-RNTI) associated with the first PCI or a second C-RNTI associated with a second PCI.

Example 27 includes the method of example 26 or some other example herein, wherein the third PRACH message is to report the first C-RNTI associated with the first PCI, wherein the first PCI is: associated with a lowest control resource set pool index: associated with a smallest PCI ID: for a current serving cell or associated with the first PRACH message.

Example 28 includes the method of example 26 or some other example herein, further comprising: receiving a fourth PRACH message that includes: the first C-RNTI: or both the first and second C-RNTIs.

Example 29 includes the method of operating a user equipment (UE), the method comprising: transmitting, to a base station, a beam failure recovery (BFR) request; receiving, from the base station, a BFR response based on a first cell-radio network temporary identifier (C-RNTI) of a source serving cell or a second C-RNTI of a target serving cell, and processing, based on the second C-RNTI, a transmission to or from the target serving cell a predetermined number of symbols after receiving the BFR response.

Example 30 includes the method of example 29 or some other example herein, wherein receiving the BFR response is based on the second C-RNTI.

Example 31 includes the method of example 29 or some other example herein, further comprising: determining the second C-RNTI based on an indication in the BFR response.

Example 32 includes the method comprising: transmitting, to a user equipment (UE) via a serving cell, first configuration information to configure a first bandwidth part (BWP) of the serving cell; transmitting, to the UE, second configuration information to configure a second BWP of a neighbor cell; and transmitting a BWP switching command to handover service of the UE from the serving cell to the neighbor cell.

Example 33 includes the method of example 32 or some other example herein, wherein the second configuration information includes a physical cell identity (PCI) associated with the neighbor cell.

Example 34 includes the method of example 32 or some other example herein, further comprising: configuring the UE with a list of physical cell identities (PCIs), wherein the second configuration information includes an index that corresponds to a PCI within the list of PCIs that corresponds to the neighbor cell.

Example 35 includes the method of example 34 or some other example herein, wherein configuring the UE with the list of PCIs comprises transmitting a measurement object information element to the UE.

Example 36 includes the method of example 32 or some other example herein, wherein the first BWP and the second BWP include common radio resource control (RRC) parameters, the common RRC parameters to include a subcarrier spacing, cyclic prefix type, or one or more parameters in a BWP downlink or uplink common configuration.

Example 37 includes the method of example 32 or some other example herein, further comprising configuring the UE with a plurality of BWPs with a same identifier in different component carriers in a band or band group, wherein the plurality of BWPs are to be associated with a same PCI.

Example 38 includes the method of example 32 or some other example herein, wherein the second BWP is in a band or band group with a primary serving cell or a primary secondary serving cell.

Example 39 includes the method of example 32 or some other example herein, wherein the second BWP is an initial BWP.

Example 40 includes the method of example 39 or some other example herein, wherein the initial BWP is an initial uplink BWP or an initial downlink BWP.

Example 41 includes the method of example 40 or some other example herein, wherein the initial BWP is an initial uplink BWP and the second configuration information is to further configure an initial downlink BWP of the neighbor cell.

Example 42 includes the method of example 32 or some other example herein, wherein the first BWP is an initial BWP that is to be used for both the serving cell and the neighbor cell.

Example 43 includes a method comprising: receiving, in a first component carrier in a first band of a first band group, an indication to switch from a first bandwidth part (BWP) to a second BWP that is associated with a physical cell identity (PCI) of a non-serving cell; and switching from the first BWP to the second BWP for all component carriers within the first band or the first band group.

Example 44 includes the method of example 43 or some other example herein, further comprising: receiving configuration information to associate the second BWP with a transmission configuration indicator (TCI) state, wherein the indication to switch is a TC switching signal that includes an indication of the TCI state.

Example 45 includes the method of example 44 or some other example herein, wherein said switching comprises: switching to the second BWP a predetermined number of slots after receiving the TC switching signal or sending an acknowledgment for receiving the TC switching signal.

Example 46 includes the method of example 45 or some other example herein, further comprising: transmitting, to a base station, an indication of a lowest possible value of the predetermined number.

Example 47 includes the method of example 45 or some other example herein, further comprising: receiving, from abase station via control signaling, an indication of the predetermined number, wherein the control signaling is radio resource control (RRC) signaling, a media access control (MAC) control element (CE), or downlink control information (DCI)

Example 48 may include an apparatus comprising means to perform one or more elements of a method described in or related to any of examples 1-47, or any other method or process described herein.

Example 49 may include one or more non-transitory computer-readable media comprising instructions to cause an electronic device, upon execution of the instructions by one or more processors of the electronic device, to perform one or more elements of a method described in or related to any of examples 1-47, or any other method or process described herein.

Example 50 may include an apparatus comprising logic, modules, or circuitry to perform one or more elements of a method described in or related to any of examples 1-47, or any other method or process described herein, Example 51 may include a method, technique, or process as described in or related to any of examples 1-47, or portions or parts thereof Example 52 may include an apparatus comprising: one or more processors and one or more computer-readable media comprising instructions that, when executed by the one or more processors, cause the one or more processors to perform the method, techniques, or process as described in or related to any of examples 1-47, or portions thereof.

Example 53 may include a signal as described in or related to any of examples 1-47, or portions or parts thereof.

Example 54 may include a datagram, information element, packet, frame, segment, PDU, or message as described in or related to any of examples 1-47, or portions or parts thereof, or otherwise described in the present disclosure.

Example 55 may include a signal encoded with data as described in or related to any of examples 1-47, or portions or parts thereof, or otherwise described in the present disclosure.

Example 56 may include a signal encoded with a datagram, IE, packet, frame, segment, PDU, or message as described in or related to any of examples 1-47, or portions or parts thereof, or otherwise described in the present disclosure.

Example 57 may include an electromagnetic signal carrying computer-readable instructions, wherein execution of the computer-readable instructions by one or more processors is to cause the one or more processors to perform the method, techniques, or process as described in or related to any of examples 1-47, or portions thereof.

Example 58 may include a computer program comprising instructions, wherein execution of the program by a processing element is to cause the processing element to carry out the method, techniques, or process as described in or related to any of examples 1-47, or portions thereof.

Example 59 may include a signal in a wireless network as shown and described herein.

Example 60 may include a method of communicating in a wireless network as shown and described herein.

Example 61 may include a system for providing wireless communication as shown and described herein.

Example 62 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:

processor circuitry to:

generate a measurement object (MO) configuration to be transmitted to a user equipment (UE) to configure the UE for neighbor cell measurements, the MO configuration having a list of a physical cell identities (PCIs);

generate first configuration information to be transmitted to the UE via a serving cell to configure a first bandwidth part (BWP) of the serving cell;

generate second configuration information to be transmitted to the UE to configure a second BWP of a neighbor cell, the second configuration information to include a first index to associate the second BWP with a first PCI of the list of PCIs; and generate an indication of a transmission configuration indicator (TCI) state associated with the second BWP, the indication to be transmitted to the UE to handover service of the UE from the first BWP of the serving cell to the second BWP of the neighbor cell; and interface circuitry, coupled with the processor circuitry, to transmit the MO configuration, the first configuration information, and the second configuration information.

2. The apparatus of claim 1, wherein the

MO configuration is a measurement object new radio (MeasObjectNR) information element (IE).

3. The apparatus of claim 1, wherein the first BWP and the second BWP include common radio resource control (RRC) parameters, the common RRC parameters to include a subcarrier spacing, cyclic prefix type, or one or more parameters in a BWP downlink or uplink common configuration.

4. The apparatus of claim 1, wherein the processor circuitry is to:

generate information to be transmitted to the UE to configure the UE with a plurality of BWPs with a same identifier in different component carriers in a band or band group, wherein the plurality of BWPs are to be associated with a same PCI.

5. The apparatus of claim 1, wherein the second BWP is in a band or band group with a primary serving cell or a primary secondary serving cell.

6. The apparatus of claim 1, wherein the second BWP is an initial BWP.

7. The apparatus of claim 6, wherein the initial BWP is an initial uplink BWP or an initial downlink BWP.

8. A method comprising:

generating a measurement object (MO) configuration to be transmitted to a user equipment (UE) to configure the UE for neighbor cell measurements, the MO configuration having a list of a physical cell identities (PCIs);

generating first configuration information to be transmitted to the UE via a serving cell to configure a first bandwidth part (BWP) of the serving cell;

generating second configuration information to be transmitted to the UE to configure a second BWP of a neighbor cell, the second configuration information to include a first index to associate the second BWP with a first PCI of the list of PCIs; and generating an indication of a transmission configuration indicator (TCI) state associated with the second BWP, the indication to be transmitted to the UE to handover service of the UE from the first BWP of the serving cell to the second BWP of the neighbor cell.

9. The method of claim 8, wherein the first BWP and the second BWP include common radio resource control (RRC) parameters, the common RRC parameters to include a subcarrier spacing, cyclic prefix type, or one or more parameters in a BWP downlink or uplink common configuration.

10. A method comprising:

receiving, via a serving cell, a measurement object (MO) configuration having a list of a physical cell identities (PCIs), the MO configuration to configure neighbor cell measurements;

receiving, via the serving cell, first configuration information to configure a first bandwidth part (BWP) of the serving cell;

receiving second configuration information to configure a second BWP of a neighbor cell, the second configuration information to include a first index to associate the second BWP with a first PCI of the list of PCIs;

receiving an indication of a transmission configuration indicator (TCI) state associated with the second BWP; and performing, based on receiving the indication, a handover of service from the first BWP of the serving cell to the second BWP of the neighbor cell.

11. The method of claim 10, wherein the MO configuration is a measurement object new radio (MeasObjectNR) information element (IE).

12. The method of claim 10, wherein the first BWP and the second BWP include common radio resource control (RRC) parameters, the common RRC parameters to include a subcarrier spacing, cyclic prefix type, or one or more parameters in a BWP downlink or uplink common configuration.

13. The method of claim 10, further comprising:

receiving information to configure a plurality of BWPs with a same identifier in different component carriers in a band or band group, wherein the plurality of BWPs are to be associated with a same PCI.

14. The method of claim 10, wherein the second BWP is in a band or band group with a primary serving cell or a primary secondary serving cell.

15. The method of claim 10, wherein the second BWP is an initial BWP.

16. The method of claim 15, wherein the initial BWP is an initial uplink BWP or an initial downlink BWP.

* * * * *